(12) United States Patent  (10) Patent No.: US 8,965,182 B2
Beach et al.  (45) Date of Patent: *Feb. 24, 2015

(54) BROADCAST PROGRAM RECORDING OVERRUN AND UNDERRUN SCHEDULING SYSTEM

(75) Inventors: Brian Beach, Columbus, IN (US); Alan Waterman, Merced, CA (US)

(73) Assignee: TiVo Inc., Alviso, CA (US)

( * ) Notice: Subject to any disclaimer, the term of this patent is extended or adjusted under 35 U.S.C. 154(b) by 703 days.

This patent is subject to a terminal disclaimer.

(21) Appl. No.: 13/018,296

(22) Filed: Jan. 31, 2011

(65) Prior Publication Data

US 2011/0154407 A1  Jun. 23, 2011

Related U.S. Application Data

(63) Continuation of application No. 10/168,976, filed as application No. PCT/US00/35188 on Dec. 20, 2000, now Pat. No. 7,882,520.

(60) Provisional application No. 60/171,829, filed on Dec. 21, 1999.

(51) Int. Cl.
*H04N 5/76* (2006.01)
*H04N 21/433* (2011.01)
(Continued)

(52) U.S. Cl.
CPC ........... *H04N 21/4334* (2013.01); *H04N 5/782* (2013.01); *H04N 21/4345* (2013.01); *H04N 21/47214* (2013.01)
USPC ........... 386/292; 386/293; 386/294; 386/295; 386/296; 386/297; 725/37; 725/40; 725/50; 725/58; 725/134; 725/142; 725/39; 725/83

(58) Field of Classification Search
USPC .......... 386/291–297; 725/37, 40, 50, 58, 134, 725/142, 39, 83
See application file for complete search history.

(56) References Cited

U.S. PATENT DOCUMENTS 5,047,867 A  9/1991  Strubbe et al.
5,371,551 A  12/1994  Logan et al.
(Continued)

FOREIGN PATENT DOCUMENTS

EP  0825771 A2  2/1998
EP  0836320 A2  4/1998
(Continued)

OTHER PUBLICATIONS

English Translation of Official Action from CN for foreign patent application No. 00819093.3 dated Oct. 15, 2004 (8 pgs).
(Continued)

*Primary Examiner* — Helen Shibru
(74) *Attorney, Agent, or Firm* — Wong & Rees LLP; Kirk D. Wong

(57) ABSTRACT

A broadcast program recording overrun and underrun scheduling system provides a system for adjusting the start and end times of a broadcast program's recording schedule that has a start and end broadcast time. The viewer selects a particular broadcast program to record from the program guide using a remote input device. The system schedules the broadcast program to be recorded by inserting the program's information such as program identifier, start and end times, and storage duration into a recording schedule database. The system allows the viewer to adjust the scheduled start and/or end recording times for a broadcast program by specifying the time increment to add or subtract from the start and/or end recording times of a specific program or series of programs.

72 Claims, 18 Drawing Sheets

(51) Int. Cl.
*H04N 5/782* (2006.01)
*H04N 21/434* (2011.01)
*H04N 21/472* (2011.01)

(56) References Cited

U.S. PATENT DOCUMENTS

| | | | |
|---|---|---|---|
| 5,379,153 A | 1/1995 | Ishii et al. | |
| 5,390,027 A | 2/1995 | Henmi et al. | |
| 5,453,793 A | 9/1995 | Kim | |
| 5,923,362 A | 7/1999 | Klosterman | |
| 5,988,078 A | 11/1999 | Levine | |
| 6,118,926 A | 9/2000 | Kim et al. | |
| 6,134,582 A * | 10/2000 | Kennedy | 709/206 |
| 6,163,316 A | 12/2000 | Killian | |
| 6,181,494 B1 | 1/2001 | Fujiwara | |
| 6,233,734 B1 * | 5/2001 | Macrae et al. | 725/50 |
| 6,252,629 B1 | 6/2001 | Takatori | |
| 6,983,351 B2 * | 1/2006 | Gibble et al. | 711/159 |
| 6,987,924 B1 | 1/2006 | Fujita et al. | |
| 7,143,430 B1 * | 11/2006 | Fingerman et al. | 725/87 |
| 7,665,111 B1 | 2/2010 | Barton et al. | |
| 7,877,768 B2 * | 1/2011 | Beach et al. | 725/37 |
| 7,882,520 B2 * | 2/2011 | Beach et al. | 725/37 |
| 8,229,810 B2 * | 7/2012 | Butera et al. | 705/32 |
| 2002/0054068 A1 | 5/2002 | Ellis et al. | |
| 2002/0057893 A1 | 5/2002 | Wood et al. | |
| 2002/0162108 A1 * | 10/2002 | Lin-Hendel | 725/52 |
| 2003/0014475 A1 * | 1/2003 | Komori | 709/200 |
| 2004/0098480 A1 * | 5/2004 | Sekizawa | 709/224 |
| 2004/0128685 A1 | 7/2004 | Hassell et al. | |
| 2005/0055717 A1 | 3/2005 | Daniels | |
| 2005/0187839 A1 * | 8/2005 | Butera et al. | 705/32 |
| 2006/0062544 A1 * | 3/2006 | Southwood et al. | 386/46 |
| 2008/0188213 A1 | 8/2008 | Mankovitz | |

FOREIGN PATENT DOCUMENTS

| | | |
|---|---|---|
| EP | 1058454 A2 | 12/2000 |
| GB | 2340638 A | 2/2000 |
| WO | WO 94/11990 A1 | 5/1994 |
| WO | WO 97/48230 | 12/1997 |
| WO | WO 98/26594 | 6/1998 |
| WO | WO 00/08850 A1 | 2/2000 |

OTHER PUBLICATIONS

Claims as of Oct. 15, 2004 in CN patent application No. 00819093.3 (6 pgs).

European Patent Office, "Communication pursuant to Article 94(3) EPC", Foreign application No. 00990337.8, mailed Dec. 17, 2007, 4 pages.

Claims as of Dec. 17, 2007, Foreign application No. 00990337.8, 5 pages.

Chinese Patent Office, "Text of the First Office Action", (English translation following the original Chinese Office Action), Chinese patent application No. 200510082411.0, received Apr. 22, 2008, 6 pages.

Claims as of Apr. 22, 2008, Foreign application No. 200510082411.0, 3 pages.

Official Action from CN for foreign patent application No. 00819093.3 dated Apr. 15, 2005 (9 pgs).

Claims as of Apr. 15, 2005 in CN patent application No. 00819093.3 (8 pgs).

European Search Report dated Feb. 16, 2011 received in related European application No. 10013209.1, 8 pages.

Current Claims as of Feb. 16, 2011 received in related European patent application No. 10013209.1, 3 pages.

\* cited by examiner

Structure of a Viewing Object

Structure of a Object Schema

Traversing a Directory Graph

FIG. 5 Processing Preference Information

FIG. 6 Scheduling Recordings

BROADCAST PROGRAM RECORDING OVERRUN AND UNDERRUN SCHEDULING SYSTEM

CROSS-REFERENCE TO RELATED APPLICATIONS; PRIORITY CLAIM

This Continuation Application claims benefit of U.S. Pat. No. 7,882,520 to be issued on Feb. 1, 2011 (Non-Provisional U.S. patent application Ser. No. 10/168,976, filed Jun. 21, 2002) titled "Broadcast Program Recording Overrun and Underrun Scheduling System", which claims priority to International Application No. PCT/US00/35188 filed Dec. 20, 2000, which claims priority to Provisional U.S. Patent Application No. 60/171,829 filed Dec. 21, 1999, the entire contents of which is hereby incorporated by reference as if fully set forth herein, under 35 U.S.C. §119(e).

FIELD OF THE INVENTION

The invention relates to the storing and viewing of television program material in a computer environment. More particularly, the invention relates to adjusting the scheduling of television program recordings to adapt to schedule variations in a computer environment.

BACKGROUND OF THE INVENTION

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

DESCRIPTION OF THE PRIOR ART

Video Cassette Recorders (VCR) have the ability to record television program material onto video tape. The typical VCR restricts the viewer to manually setting recording start and end times. These time frames are static and do not change unless the viewer edits or deletes the schedule.

Products such as Gemstar Development Corp.'s VCR Plus allow the viewer to record a television program by entering a code number into the VCR. The VCR automatically sets itself to record a particular channel and start and end time specified by the code number. The code number is obtained from a television program guide printed in a newspaper or periodical.

The VCR Plus approach has the same drawback as the manual recordings. The start and end times of the recording period are fixed. The manual and VCR Plus approaches do not take into the account the fact that television broadcasting stations are not always punctual and many begin their scheduled programs early or late.

The introduction of Digital Video Recorders (DVR) have revolutionized the television recording industry. DVRs store program material onto a storage medium that is easily accessible, reusable, and the recording does not degrade over time as with video tapes.

The current generation of DVRs allow the viewer to select the programs that he wants to record from an on-screen television program guide. The user simply highlights the program name and presses a button on his remote control. The DVR schedules the recording of the program at the scheduled time and duration.

This approach also has the drawback of not taking into account variations in the program schedules. Sports games such as football and baseball go into overtime and the viewer is unable to adjust the recording of the program to take the extra time into account.

It would be advantageous to provide a broadcast program recording overrun and underrun scheduling system that allows the user to specify the amount of time to add and/or subtract from the start and end times of a preset recording schedule for a particular program. It would further be advantageous to provide a broadcast program recording overrun and underrun scheduling system that schedules the recording of program data on a storage medium.

SUMMARY OF THE INVENTION

The invention provides a broadcast program recording overrun and underrun scheduling system. The system allows the user to specify the time increment to add and/or subtract from the start and end times of a preset recording schedule for a particular program. In addition, the invention provides a system that schedules the recording of program data on a storage medium.

A client device, typified in application Ser. No. 09/126,071, owned by the Applicant, provides functionality typically associated with the present generation of Digital Video Recorders (DVR), such as the storage of a large amount of video content, ability to choose and play this content on demand, and full "VCR-like" control of the delivery of the content.

The invention provides a system for adjusting the start and end times of a broadcast program's recording schedule that has a predetermined start and end broadcast time. An on screen program guide is displayed to the viewer via a monitor or television. The program guide lists the predetermined scheduled broadcast times and channels of a plurality of broadcast programs.

The viewer selects a particular broadcast program to record from the program guide using a remote input device. The invention schedules the broadcast program to be recorded by inserting the program's information such as program identifier, start and end times, and storage duration into a recording schedule database.

The invention allows the viewer to adjust the scheduled start and/or end recording times for a broadcast program. The viewer specifies the time increment to add or subtract from the start and/or end recording times of a specific program or series of programs. The invention adjusts the recording schedule to the viewer's modifications.

Broadcast programs are recorded onto a persistent storage device when the recording schedule indicates that it is time to do so. The viewer is allowed to adjust the end recording time of a program while the program is being recorded.

The viewer can randomly access the recorded programs on the persistent storage device for play back.

Other aspects and advantages of the invention will become apparent from the following detailed description in combination with the accompanying drawings, illustrating, by way of example, the principles of the invention.

Other aspects and advantages of the invention will become apparent from the following detailed description in combination with the accompanying drawings, illustrating, by way of example, the principles of the invention.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE INVENTION

The invention is embodied in a broadcast program recording overrun and underrun scheduling system in a computer environment. A system according to the invention allows the user to specify the time increment to add and/or subtract from the start and end times of a preset recording schedule for a particular program. In addition, the invention provides a system that schedules the recording of program material on a storage medium.

The invention provides a system for adjusting the start and end times of a broadcast program's recording schedule that has a predetermined start and end broadcast time. Electronic program guides list predetermined scheduled broadcast times and channels of all of the television broadcast programs that are available to a particular geographic area. The time that a television program is actually broadcasted differs in many cases from the predetermined schedule. The invention allows the viewer to adjust the scheduled program recording times to the actual situation.

The Database of Television Viewing Information

Figure 1:
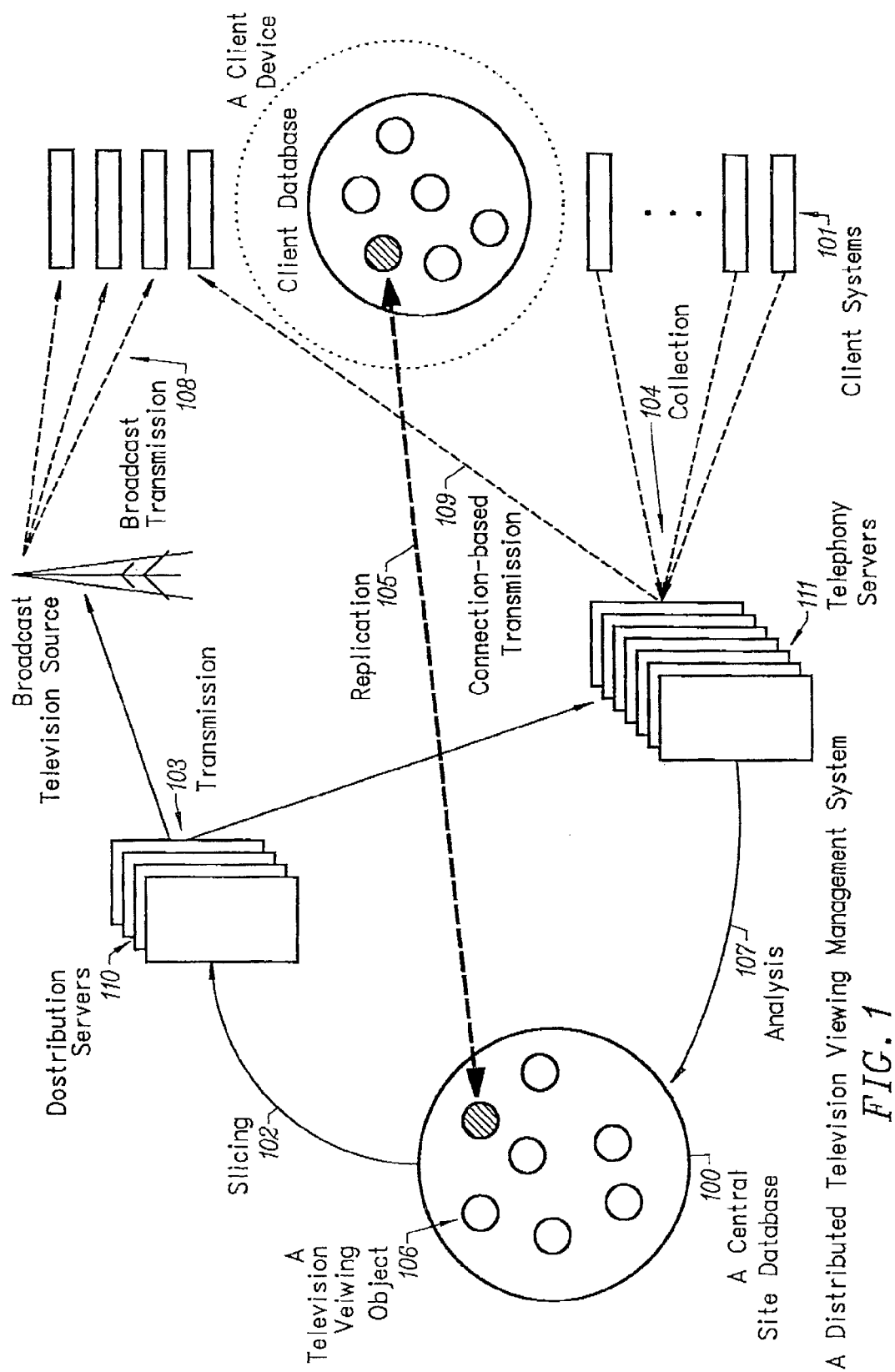
FIG. 1 is a block schematic diagram of a preferred embodiment of a distributed television viewing management system according to the invention.

FIG. 1 gives a schematic overview of the invention. Central to the invention is a method and apparatus for maintaining a distributed database of television viewing information among computer systems at a central site 100 and an extremely large number of client computing systems 101. The process of extracting suitable subsets of the central copy of the database is called "slicing" 102, delivering the resulting "slices" to clients is called "transmission" 103, delivering information collected about or on behalf of the viewer to the central site is called "collection" 104, and processing the collected information to generate new television viewing objects or reports is called "analysis" 107; in all cases, the act of recreating an object from one database within another is called "replication" 105. Data items to be transmitted or collected are termed "objects" 106, and the central database and each replicated subset of the central database contained within a client device is an "object-based" database. The objects within this database are often termed "television viewing objects", "viewing objects", or simply "objects", emphasizing their intended use. However, one skilled in the art will readily appreciate that objects can be any type of data.

The viewing object database provides a consistent abstract software access model for the objects it contains, independent of and in parallel with the replication activities described herein. By using this interface, applications may create, destroy, read, write and otherwise manipulate objects in the database without concern for underlying activities and with assurance that a consistent and reliable view of the objects in the database and the relationships between them is always maintained.

Basic Television Viewing Object Principles

Figure 2:
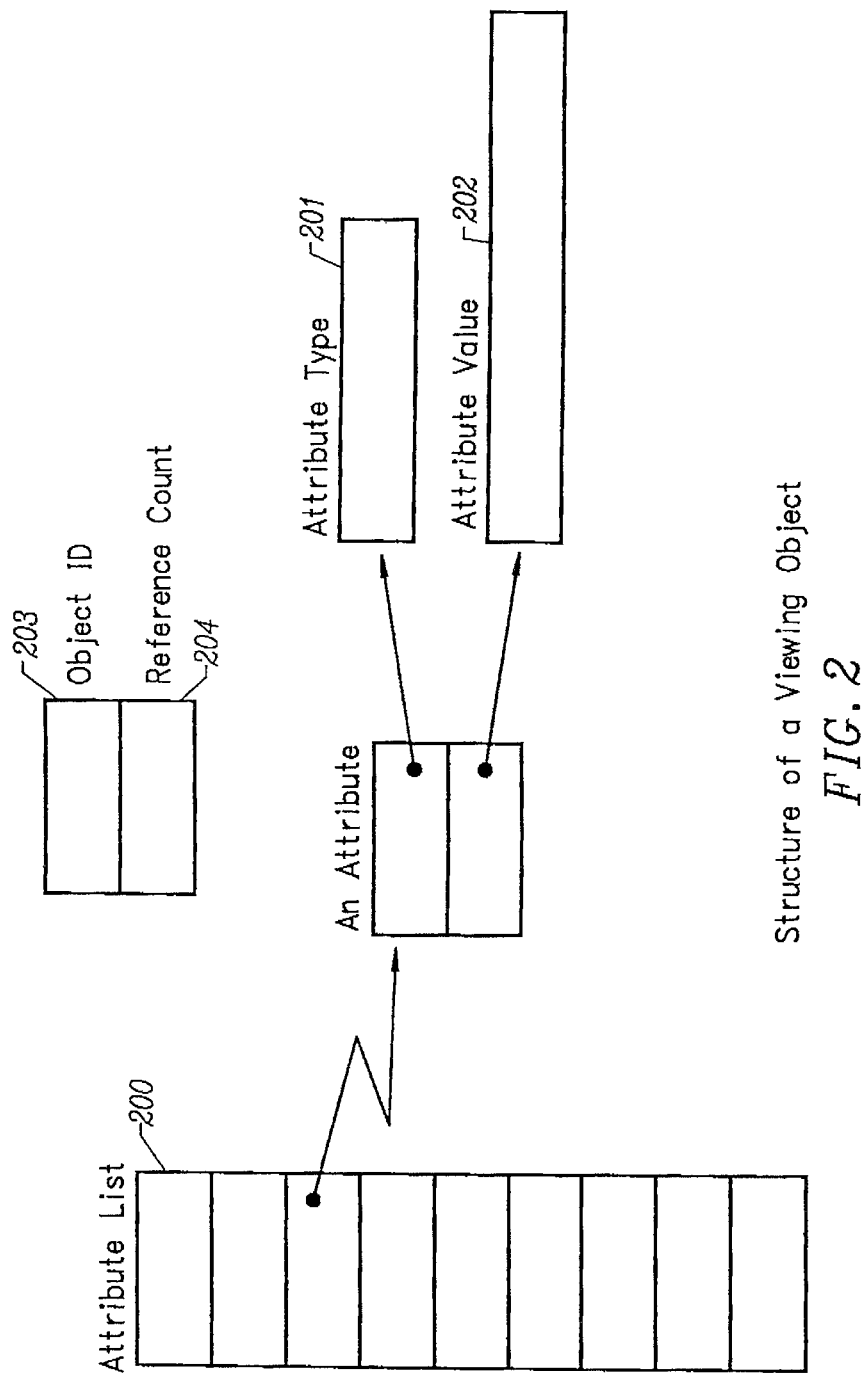
FIG. 2 is a block schematic diagram of the structure of a viewing object in computer storage for programmatic access according to the invention.

Referring to FIG. 2, television viewing objects are structured as a collection of "attributes" 200. Each attribute has a type 201, e.g., integer, string or boolean, and a value 202. All attribute types are drawn from a fixed pool of basic types supported by the database.

The attributes of an object fall into two groups: "basic" attributes, which are supplied by the creator or maintainer of the viewing object; and "derived" attributes, which are automatically created and maintained by mechanisms within the database. Basic attributes describe properties of the object itself; derived attributes describe the relationships between objects. Basic attributes are replicated between databases, whereas derived attributes are not.

Figure 3:
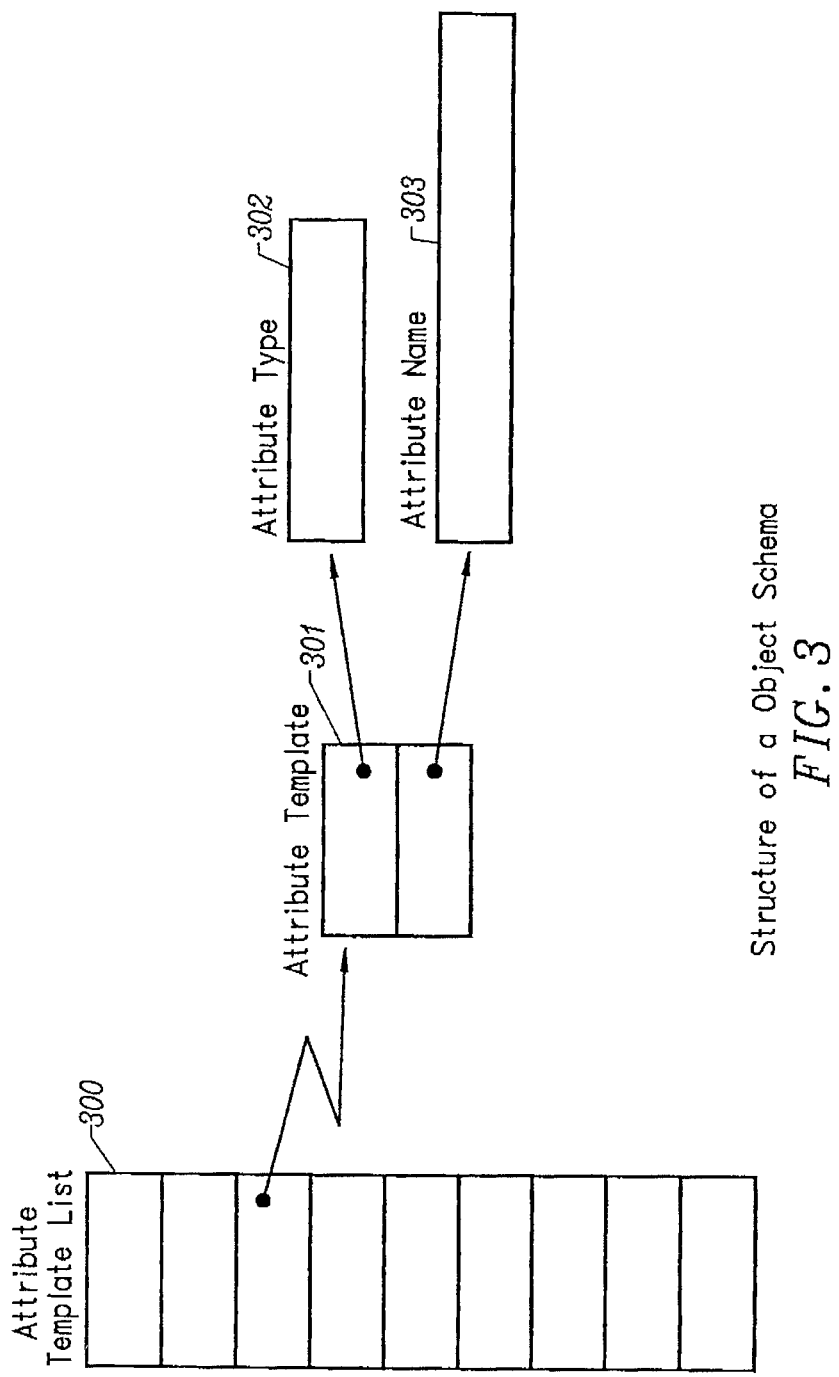
FIG. 3 is a block schematic diagram showing how the schema for a viewing object is structured in computer storage for programmatic access according to the invention.

With respect to FIG. 3, there is a small set of fundamental object types defined by the invention; each object type is represented as a specific set of related attributes 300, herein called a "schema". The schema defines a template for each attribute type 301, which includes the type 302 and name of the attribute 303. Actual television viewing objects are created by allocating resources for the object and assigning values to the attributes defined by the schema. For example, a "program" schema might include attributes such as the producer, director or actors in the program, an on-screen icon, a multi-line description of the program contents, an editorial rating of the program, etc. A physical program object is created by allocating storage for it, and filling in the attributes with relevant data.

There is one special object type predefined for all databases called the schema type. Each schema supported by the database is represented by a schema object. This allows an application to perform "introspection" on the database, i.e., to dynamically discover what object types are supported and their schema. This greatly simplifies application software and avoids the need to change application software when schemas are changed, added or deleted. Schema objects are handled the same as all other viewing objects under the methods of this invention.

Referring again to FIG. 2, each object in a database is assigned an "object ID" 203 which must be unique within the database. This object ID may take many forms, as long as each object ID is unique. The preferred embodiment uses a 32-bit integer for the object ID, as it provides a useful tradeoff between processing speed and number of unique objects allowed. Each object also includes a "reference count" 204, which is an integer giving the number of other objects in the database which refer to the current object. An object with a reference count of zero will not persist in the database (see below).

One specific type of viewing object is the "directory" object. A directory object maintains a list of object IDs and an associated simple name for the object. Directory objects may include other directory objects as part of the list, and there is a single distinguished object called the "root" directory. The sequence of directory objects traversed starting at the root directory and continuing until the object of interest is found is called a "path" to the object; the path thus indicates a particular location within the hierarchical namespace created among all directory objects present in the database. An object may be referred to by multiple paths, meaning that one object may have many names. The reference count on a viewing object is incremented by one for each directory which refers to it.

Methods for the Maintenance of Database Consistency and Accuracy

One of the features of a preferred embodiment of the invention is to insure that each database replica remains internally consistent at all times, and that this consistency is automatically maintained without reference to other databases or the need for connection to the central site. There is no assurance that transmission or collection operations happen in a timely manner or with any assured periodicity. For instance, a client system may be shut off for many months; when a transmission to the system is finally possible, the replication of objects must always result in a consistent subset of the server database, even if it is not possible to transmit all objects needed to bring the central and client databases into complete synchronization.

Even more serious, there can be no guarantee of a stable operational environment while the database is in use or being updated. For example, electrical power to the device may cease. This invention treats all database updates as "transactions", meaning that the entire transaction will be completed, or none of it will be completed. The specific technique chosen is called "two-phase commit", wherein all elements of the transaction are examined and logged, followed by performing the actual update. One familiar in the art will appreciate that a standard journaling technique, where the transaction is staged to a separate log, combined with a roll-forward technique which uses the log to repeat partial updates that were in progress when the failure occurred, is sufficient for this purpose.

One required derived attribute of every object is the "version", which changes with each change to the object; the version attribute may be represented as a monotonically increasing integer or other representation that creates a monotonic ordering of versions. The schema for each object that may be replicated includes an attribute called "source version" which indicates the version of the object from which this one was replicated.

Transmission of a viewing object does not guarantee that every client receives that object. For instance, while the object is being broadcast, external factors such as sunspots, may destroy portions of the transmission sequence. Viewing objects may be continually retransmitted to overcome these problems, meaning that the same object may be presented for replication multiple times. It is inappropriate to simply update the database object each time an object to be replicated is received, as the version number will be incremented although no change has actually occurred. Additionally, it is desirable to avoid initiating a transaction to update an object if it is unnecessary; considerable system resources are consumed during a transaction.

Two approaches are combined to resolve this problem. First, most objects will have a basic attribute called "expiration". This is a date and time past which the object is no longer valid, and should be discarded. When a new object is received, the expiration time is checked, and the object discarded if it has expired. Expiration handles objects whose transmission is delayed in some fashion, but it does not handle multiple receptions of the same unexpired object.

The source version attribute handles this problem. When a viewing object is transmitted, this attribute is copied from the current version attribute of the source object. When the viewing object is received, the source version of the received object is compared with the source version of the current object. If the new object has a higher source version attribute, it is copied over the existing object, otherwise it is discarded.

It is assumed that a much greater number of viewing objects are transmitted than are of interest to any particular client system. For example, a "channel" viewing object which describes the channels on a particular cable system is of no interest to clients attached to other cable systems. Because of the overhead of capturing and adding new objects to the database, it would be advantageous for received objects to be filtered on other attributes in addition to those described above. The invention accomplishes this by using a filtering process based on object type and attribute values. In one implementation, this filtering process is based on running executable code of some kind, perhaps as a sequence of commands, which has been written with specific knowledge of various object types and how they should be filtered.

In a preferred embodiment of the invention, a "filter" object is defined for each object type which indicates what attributes are required, should not be present, or ranges of values for attributes that make it acceptable for addition to the database. One skilled in the art will readily appreciate that this filter object may contain executable code in some form, perhaps as a sequence of executable commands. These commands would examine and compare attributes and attribute values of object being filtered, resulting in an indication of whether the object should be the subject of further processing.

Viewing objects are rarely independent of other objects. For example, a "showing" object (describing a specific time on a specific channel) is dependent on a "program" object (describing a specific TV program). One important aspect of maintaining consistency is to insure that all dependent objects either already exist in the database or are to be added as part of a single transaction before attempting to add a new viewing object. This is accomplished using a basic attribute of the new viewing object called the "dependency" attribute, which simply lists the object IDs and source versions of objects that the new object is dependent on. Clearly, new versions of an object must be compatible, in the sense that the schema defining new versions be the same or have a strict superset of the attributes of the original schema.

When a new viewing object is received, the database is first checked to see if all dependencies of that object are present; if so, the object is added to the database. Otherwise, the new object is "staged", saving it in a holding area until all dependent objects are also staged. Clearly, in order for a new set of viewing objects to be added to the database, the dependency graph must be closed between objects in the staging area and objects already existing in the database, based on both object ID and source version. Once closure is achieved, meaning all dependent objects are present, the new object(s) are added to the database in a single atomic transaction.

Naming and Finding Television Viewing Objects

Figure 4:
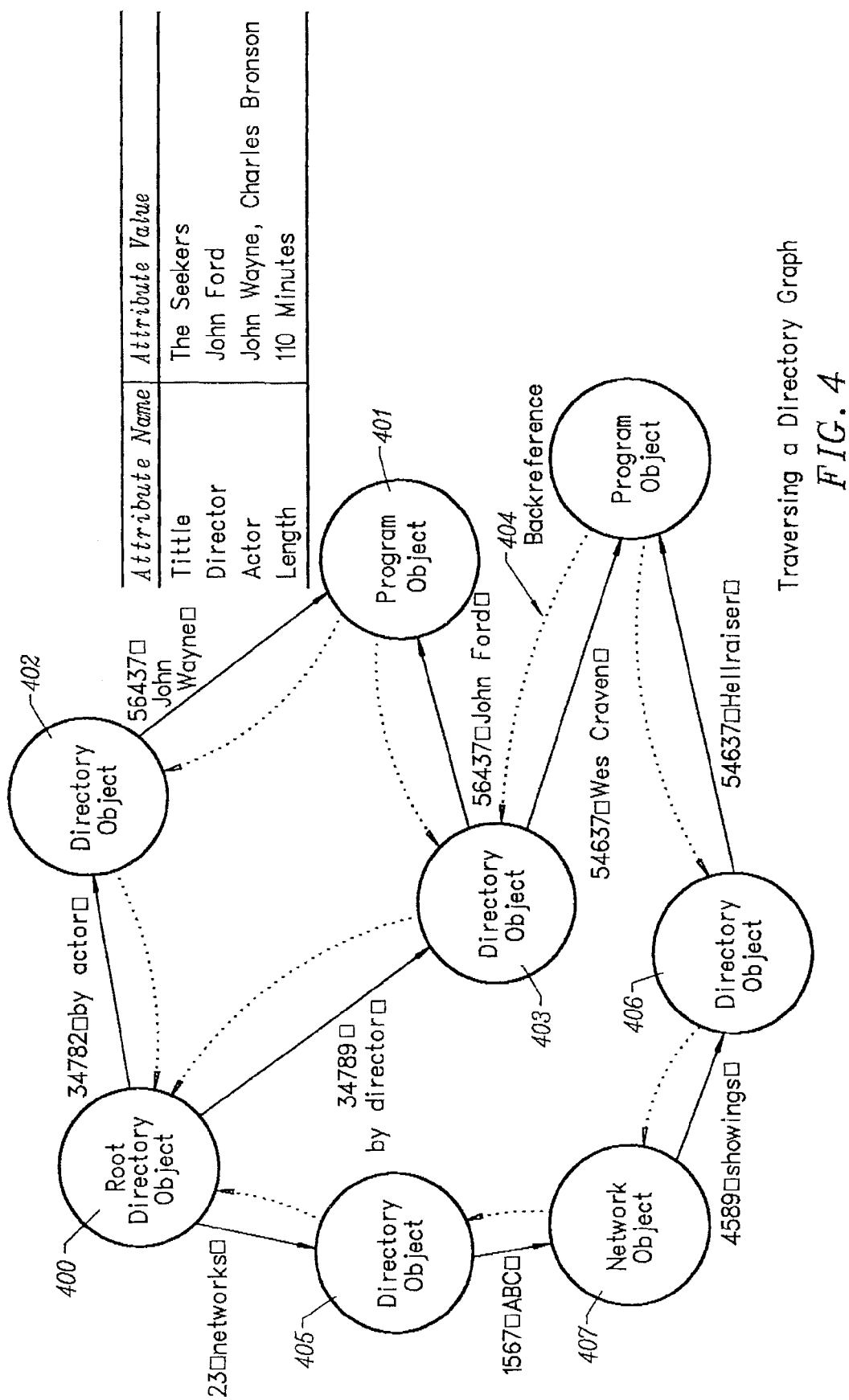
FIG. 4 is a block schematic diagram showing an example graph of relationships between viewing objects which describe information about programs according to the invention.

Directory objects have been described previously. Referring to FIG. 4, the collection of directory objects, and the directed graph formed by starting at the root path 400 and enumerating all possible paths to viewing objects is called a "namespace". In order for an object to be found without knowing a specific object ID, one or more paths within this namespace must refer to it. For instance, application software has little interest in object IDs, instead the software would like to refer to objects by paths, for instance "/tvschedule/today". In this example, the actual object referred to may change every day, without requiring changes in any other part of the system.

One way in which a path to an object may be established is by specifying a "pathname" basic attribute on the object. The object is added to the database, and directory objects describing the components of the path are created or updated to add the object. Such naming is typically used only for debugging the replication mechanisms. Setting explicit paths is discouraged, since the portions of the central database replicated on each client system will be different, leading to great difficulty in managing pathnames among all replicas of the database.

A preferred method for adding an object to the database namespace is called "indexing". In a preferred embodiment of the invention, an "indexer" object is defined for each object type which indicates what attributes are to be used when indexing it into the database namespace. One skilled in the art will readily appreciate that this indexer object may contain executable code in some form, perhaps as a sequence of executable commands. These commands would examine and compare attributes and attribute values of object being indexed, resulting in an indication of where the object should be located in the namespace.

Based on the object type, the indexer examines a specific set of attributes attached to the object. When such attributes are discovered the indexer automatically adds a name for the object, based on the value of the attribute, within the hierarchical namespace represented by the graph of directories in the database. Referring again to FIG. 4, a program object may have both an "actor" attribute with value "John Wayne" and a "director" attribute with value "John Ford" 401. The root directory might indicate two sub-directories, "byactor" 402 and "bydirector" 403. The indexer would then add the paths "/byactor/John Wayne" and "/bydirector/John Ford" to the database, both of which refer to the same object 401.

A derived attribute is maintained for each object listing the directory objects which refer to this object 404. As the indexer adds paths to the namespace for this object, it adds the final directory ID in the path to this list. This insures closure of the object graph—once the object has been found, all references to that object within the database are also found, whether they are paths or dependencies.

This unique and novel method of adding objects to the database has significant advantages over standard approaches. The indexer sorts the object into the database when it is added. Thus, the search for the object associated with a particular path is a sequence of selections from ordered lists, which can be efficiently implemented by one familiar with the art.

Deleting Objects from the Database

While the rules for adding objects to the database are important, the rules for removing objects from the database are also important in maintaining consistency and accuracy. For example, if there were no robust rules for removing objects, the database might grow unboundedly over time as obsolete objects accumulate.

The cardinal rule for deleting objects from the database is based on reference counting; an object whose reference count drops to zero is summarily deleted. For instance, this means that an object must either be referred to by a directory or some other object to persist in the database. This rule is applied to all objects in the closed dependency graph based on the object being deleted. Thus, if an object which refers to other objects (such as a directory) is deleted, then the reference count on all objects referred to is decremented, and those objects similarly deleted on a zero count, and so forth.

There is also an automatic process which deletes objects from the database called the "reaper". Periodically, the reaper examines all objects in the database, and depending on the object type, further examines various attributes and attribute values to decide if the object should be retained in the database. For example, the expiration attribute may indicate that the object is no longer valid, and the reaper will delete the object.

In the preferred embodiment, using a method similar to (or perhaps identical to) the filtering and indexing methods described above, the reaper may instead access a reaper object associated with the object type of the current object, which may contain executable code of various kinds, perhaps a sequence of executable commands. This code examines the attributes and attribute values of the current object, and determines if the object should be deleted.

The overhead of individually deleting every object for which the reference count has been decremented to zero may be quite high, since every such deletion results in a transaction with the database. It would be advantageous to limit the performance impact of reaping objects, such that foreground operations proceed with maximum speed. In a preferred embodiment, this is accomplished using a technique based on common garbage collection methods.

For instance, instead of deleting an object whose reference count has been decremented to zero, the reaper performs no other action. Periodically, a background task called the garbage collector examines each object in the database. If the object has a reference count of zero, it is added to a list of objects to be deleted. In one embodiment, once the garbage collector has examined the entire database, it would delete all such objects in a single transaction. One familiar in the art will appreciate that this method may also result in a significant performance penalty, as other accesses to the database may be delayed while the objects are being deleted. In addition, if all objects are to be properly deleted, changes to the database may have to be delayed while the garbage collector is active, resulting in even worse performance.

In a preferred embodiment, the garbage collector examines the database in a series of passes. Once a specific number of objects has been collected, they are deleted in a single transaction. Said process continues until all objects have been examined. This technique does not guarantee that all garbage objects are collected during the examination process, since parallel activities may release objects previously examined. These objects will be found, however, the next time the garbage collector runs. The number of objects deleted in each pass is adjustable to achieve acceptable performance for other database activities.

Operations on the Distributed Television Viewing Object Database

Considerations in Maintaining the Distributed Viewing Object Database

The replication of television viewing objects among the instances of the distributed database necessarily requires the transmission of objects over unreliable and unsecure distribution channels.

For example, if the objects are transmitted over a broadcast mechanism, such as within a radio or television transmission, there can be no assurance that the data is transmitted accurately or completely. Weather, such as rainstorms, may cause dropouts in the transmission. Other sources of interference may be other broadcast signals, heavy equipment, household appliances, etc.

One skilled in the art will readily appreciate that there are standard techniques for managing the transmission of data over unreliable channels, including repeated transmissions, error correcting codes, and others, which may be used for transmission, any or all of which may be used in any particular instance.

For efficiency, objects to be replicated are gathered together into distribution packages, herein called "slices". A slice is a subset of the television viewing object database which is relevant to clients within a specific domain, such as a geographic region, or under the footprint of a satellite transmitter.

Security of these slices is quite important. Slices are used to add objects to the database which are used to provide valuable services to users of the database, as well as to store information that may be considered private or secret. Because of the broadcast-oriented nature of slice transmission, slices may be easily copied by third parties as they are transmitted. A practical solution to these problems is to encrypt the slice during transmission. An ideal reference text on the techniques employed in the invention is "Applied Cryptography: Protocols, Algorithms, and Source Code in C" by Bruce Schneier, John Wiley and Sons, 1995.

In a preferred embodiment of the invention, a secure, encrypted channel is established using techniques similar to those described in U.S. Pat. No. 4,405,829, often described as asymmetric key encryption, or sometimes public/private key pair encryption. A practitioner skilled in the art will recognize that protocols based on asymmetric key encryption serves as a reliable and efficient foundation for authentication of client devices and secure distribution of information. In general, authentication is provided using an exchange of signed messages between the client and central systems. Secure distribution is provided by encrypting all communications using a short-lived symmetric key sent during an authentication phase.

Successful security requires that sender and receiver agree beforehand on the asymmetric key pair to be used for encryption. Such key distribution is the weakest link in any cryptographic system for protecting electronic data. Application Ser. No. 09/357,183, entitled "Self-Test Electronic Assembly and Test System," filed Jul. 19, 1999, also owned by the Applicant, describes a mechanism whereby the client device generates the asymmetric key pair automatically as the final step in the manufacturing process. The private key thus generated is stored within a secure microprocessor embedded within the client device, such that the key is never presented to external devices. The public key thus generated is transmitted to a local manufacturing system, which records the key along with the client serial number in a secure database. This database is later securely transmitted to the central distribution system, where it is used to perform secure communications with the client.

This unique and novel application of key generation solves the problem of key distribution, as the private key is never presented to external components in the client, where it might be discerned using special tools, such as a logic analyzer. Instead, it may only be used within the security microprocessor itself to decrypt messages originally encrypted with the public key, the results of which are then provided to external components.

The remainder of this discussion assumes that all communications between client and central systems are authenticated and encrypted as described above.

Transmitting Viewing Objects to the Client Systems

Referring again to FIG. 1, in a preferred embodiment of the invention the following steps constitute "transmission" of television viewing objects from the central database using slices:

1. There may be many mechanisms for transmitting slices to the universe of client viewing devices. For instance, the slices may be directly downloaded over a telephone modem or cable modem 109, they may be modulated into lines of the Vertical Blanking Interval (VBI) of a standard television broadcast 108, or added to a digital television multiplex signal as a private data channel. One skilled in the art will readily appreciate that any mechanism which can transmit digital information may be used to transmit slices of the television viewing object database.

The first step in preparing television viewing objects for transmission is recognizing the transmission mechanism to be used for this particular instance, and creating a slice of a subset of the database that is customized for that mechanism. For example, the database may contain television viewing objects relating to all programs in the country. However, if television viewing objects are to be sent using VBI modulation on a local television signal, only those television viewing objects relating to programs viewable within the footprint of the television broadcast being used to carry them should be contained within the relevant slice. Alternatively, if some of the television viewing objects contain promotional material related to a particular geographic region, those objects should not be transmitted to other geographic regions.

In a preferred embodiment of the invention, the speed and periodicity of traversing the database and generating slices for transmission is adjustable in an arbitrary fashion to allow useful cost/performance tradeoffs to be made. For instance, it may only be necessary to create slices for certain transmission methods every other day, or every hour.

The final step in preparing each slice is to encrypt the slice using a short-lived symmetric key. Only client devices which have been authenticated using secure protocols will have a copy of this symmetric key, making them able to decrypt the slice and access the television viewing objects within it.

2. Once a slice is complete, it is copied to the point at which the transmission mechanism can take and send the data 110. For telephone connections, the slice is placed on a telephony server 111 which provides the data to each client as it calls in. If television broadcast is used, the slice is copied onto equipment co-resident with the station television transmitter, from whence it is modulated onto the signal. In these and similar broadcast-oriented cases, the slice is "carouseled", i.e., the data describing the slice is repeated continually until a new slice is provided for transmission.

This repetitive broadcast of slices is required because there can be no assurance that the signal carrying the data arrives reliably at each client. The client device may be powered off, or there may be interference with reception of the signal. In order to achieve a high degree of probability that the transmitted slices are properly received at all client devices, they are continually re-broadcast until updated slices are available for transmission.

A preferred embodiment of the invention uses broadcast mechanisms such as a television signal to transmit the slice. However, it is desirable to provide for download over a connection-based mechanism, such as a modem or Internet connection. Using a connection-based mechanism usually results in time-based usage fees, making it desirable to minimize the time spent transmitting the slice.

This is accomplished using a two-step process. When the connection is established, the client system sends an inventory of previously received slices to telephony servers 111. The server compares this inventory with the list of slices that should have been processed by that client. Slices which were not processed are transmitted to the client system.

3. The slice is transmitted by breaking the encrypted slice into a succession of short numbered data packets. These packets are captured by client systems and held in a staging area until all packets in the sequence are present. The packets are reassembled into the slice, which is then decrypted. The television viewing objects within the slice are then filtered for applicability, possibly being added to the local television viewing object database. This process replicates a portion of the central database of television viewing objects reliably into the client.

The invention keeps track of the time at which data packets are received. Data packets which are older than a selected time period are purged from the staging area on a periodic basis; this avoids consuming space for an indefinite period while waiting for all parts of a slice to be transmitted.

Especially when transmitting the objects over a broadcast medium, errors of various kinds may occur in the transmitted data. Each data packet is stamped with an error detecting code (a parity field or CRC code, for example). When an error is detected the data packet is simply discarded. The broadcast carousel will eventually retransmit the data packet, which is likely to be received properly. Slices of any size may thus be sent reliably; this is achieved at the cost of staging received portions of the object on the client until all portions are properly received.

4. There may be one or more "special" slices transmitted which communicate service related data to the client system, particularly service authorization information. It is important that the service provider be able to control the client system's access to premium services if the viewer has failed to pay his bill or for other operational reasons.

One particular type of special slice contains an "authorization" object. Authorization objects are generally encrypted using asymmetric key encryption based on the public/private key pair associated with a specific client. If the slice can be successfully decrypted by the security microprocessor using the embedded private key, the slice will contain an object indicating the allowable time delay before another authorization object is received, as well as one or more symmetric keys valid for a short time period. The delay value is used to reset a timestamp in the database indicating when the client system will stop providing services. The symmetric keys are stored in the local television viewing object database, to be used in decrypting new slices which may be received.

If the client has not received a proper authentication object by the time set in the database, it will commence denial of most services to the viewer (as specified by the service provider). Also contained within an authentication object are one or more limited-lifetime download keys which are needed to decrypt the slices that are transmitted. Clearly, if a client system is unable to authenticate itself, it will not be able to decrypt any objects.

Each authorization slice is individually generated and transmitted. If broadcast transmission is used for the slices, all relevant authorizations are treated identically to all other slices and carouseled along with all other data. If direct transmission is used, such as via a phone connection, only the authentication slice for that client is transmitted.

5. Once the client device has received a complete database slice, it uses the methods described earlier to add the new object contained within it to the database.

Collecting Information from the Client Systems

Referring again to FIG. 1, in a preferred embodiment of the invention the following steps constitute "collection" of television viewing objects from each client database:

1. As the viewer navigates the television channels available to him, the client system records interesting information, such as channel tuned to, time of tuning, duration of stay, VCR-like actions (e.g., pause, rewind), and other interesting information. This data is stored in a local television viewing object.

Additionally, the viewer may indicate interest in offers or promotions that are made available, or he may indicate a desire to purchase an item. This information is also recorded into a local television viewing object.

Additionally, operation of the client device may result in important data that should be recorded into a television viewing object. For example, errors may occur when reading from the hard disk drive in the client, or the internal temperature of the device may exceed operational parameters. Other similar types of information might be failure to properly download an object, running out of space for various disk-based operations, or rapid power cycling.

2. At a certain time, which may be immediate or on a periodic basis, the client system contacts the central site via a direct connection 104 (normally via phone and/or an Internet connection). The client device sends a byte sequence identifying itself which is encrypted with its secret key. The server fetches the matching television viewing object for the client device from the database, and uses the key stored there to decrypt the byte sequence. At the same time, the server sends a byte sequence to the client, encrypted in its secret key, giving the client a new one-time encryption key for the session.

Both sides must successfully decrypt their authentication message in order to communicate. This two-way handshake is important, since it assures both client and server that the other is valid. Such authentication is necessary to avoid various attacks that may occur on the client system. For example, if communications were not authenticated in such a fashion, a malicious party might create an "alias" central site with a corrupt television viewing object database and provide bad information to a client system, causing improper operation. All further communication is encrypted using the one-time session key. Encrypted communication is necessary because the information may pass across a network, such as the Internet, where data traffic is open to inspection by all equipment it passes through. Viewing objects being collected may contain information that is considered private, so this information must be fully protected at all times.

Assuming that the authentication phase is successful, the two parties treat the full-duplex phone line as two one-way broadcast channels. New slices are delivered to the client, and viewing data to be collected is sent back. The connection is ended when all data is delivered.

One skilled in the art will readily appreciate that this connection may take place over a network, such as the Internet running standard TCP/IP protocols, transparently to all other software in the system.

3. Uploaded information is handled similarly by the server; it is assumed to represent television viewing objects to be replicated into the central database. However, there may be many uploaded viewing objects, as there may be many clients of the service. Uploaded objects are therefore assigned a navigable attribute containing information about their source; the object is then indexed uniquely into the database namespace when it is added.

Uploaded viewing objects are not immediately added to the central database; instead they are queued for later insertion into the database. This step allows the processing of the queue to be independent of the connection pattern of client devices. For instance, many devices may connect at once, generating a large number of objects. If these objects were immediately added to the central database, the performance of all connections would suffer, and the connection time would increase. Phone calls are charged by duration, thus any system in which connection time increases as a function of load is not acceptable.

Another advantage of this separation is that machine or network failures are easily tolerated. In addition, the speed at which viewing objects are processed and added to the central database may be controlled by the service provider by varying the computer systems and their configurations to meet cost or performance goals.

Yet another advantage of this separation is that it provides a mechanism for separating data collected to improve service operations and data which might identify an individual viewer. It is important that such identifying data be kept private, both for legal reasons and to increase the trust individuals have in the service. For instance, the navigable attribute assigned to a viewing object containing the record of a viewer's viewing choices may contain only the viewer's zip code, meaning that further processing of those objects can construct no path back to the individual identity.

Periodic tasks are invoked on the server to cull these objects from the database and dispose of them as appropriate. For example, objects indicating viewer behavior are aggregated into an overall viewer behavior model, and information that might identify an individual viewer is discarded. Objects containing operational information are forwarded to an analysis task, which may cause customer service personnel to be alerted to potential problems. Objects containing transactional information are forwarded to transaction or commerce systems for fulfillment.

Any of these activities may result in new television viewing objects being added to the central database, or in existing objects being updated. These objects will eventually be transmitted to client devices. Thus, the television viewing management system is closed loop, creating a self-maintaining replicated database system 105 which can support any number of client systems.

Processing of Television Viewing Objects by Client Systems

Television viewing objects may contain the following types of information: television program descriptions and showing times; cable, satellite or broadcast signal originator information, such as channel numbering and identification; viewer preference information, such as actors, genre, showing times, etc.; software, such as enhanced database software, application software, operating system software, etc.; statistical modeling information such as preference vectors, demographic analysis, etc.; and any other arbitrary information that may be represented as digital data.

Methods Applied to Program Guide Objects

Program guide objects contain all information necessary for software running in the client system to tune, receive, record and view programs of interest to the user of the client system, selecting from among all available programs and channels as described by objects within the database.

This program guide information is updated on a regular basis by a service provider. This is handled by the provider acquiring program guide information in some manner, for instance, from a commercial supplier of such information or other sources of broadcast schedule information. This data is then processed using well-understood software techniques to reduce the information to a collection of inter-related viewing objects.

Referring again to FIG. 4, a typical relationship between program guide objects is shown. A television "network" object 407 is any entity which schedules and broadcasts television programming, whether that broadcast occurs over the air, cable, satellite, or other suitable medium. A television "program" object 401 is a description of any distinct segment of a television broadcast signal, such as a particular program, commercial advertisement, station promotion, opener, trailer, or any other bounded portion of a television signal. A "showing" object 406 is a portion of the broadcast schedule for a network on which a program is broadcast. A "channel map" object maps a network broadcast onto a particular broadcast channel for the medium being used; for instance, a channel map object for a satellite broadcast service would include information about the transponder and data stream containing the broadcast. Using the previously described methods, this program guide data is replicated from the central site to the client systems, where application software in the client systems use the data to manage television viewing.

The service provider may also provide aggregation viewing objects, which describe a set of program guide objects that are interrelated in some fashion. For instance, a "Star-Trek" collection might contain references to all program guide objects associated with this brand name. Clearly, any arbitrary set of programs may be aggregated in this fashion. Aggregation objects are similar to directories. For instance, the Star Trek collection might be found at "/showcases/Star Trek" in the hierarchical namespace. Aggregation objects are also program guide objects, and may be manipulated in a similar fashion, including aggregating aggregation objects, and so forth.

The client system may further refine the collection of program objects. In a system where programming may be captured to internal storage, each captured program is represented by a new program guide object, becoming available for viewing, aggregation, etc. Explicit viewer actions may also result in creation of program guide objects. For instance, the viewer may select several programs and cause creation of a new aggregation object.

This description of types of program guide objects is not meant to be inclusive; there may be many different uses and ways of generating program guide objects not herein described which still benefit from the fundamental methods of the invention.

Program Guide Objects are Used by the Application Software in Five Ways:

1. In the simplest case, the viewer may wish to browse these objects to discern current or soon-to-be-available programming. The application software will map the object relationships described by the database to some form of visual and audible interface that is convenient and useful for the viewer. The viewer may indicate that a particular program is of interest, resulting in some application-specific action, such as recording the program to local storage when it is broadcast.

2. Application software may also directly process program guide objects to choose programs that may be of interest to the viewer. This process is typically based on an analysis of previously watched programming combined with statistical models, resulting in a priority ordering of all programs available. The highest priority programs may be processed in an application specific manner, such as recording the program to local storage when it is broadcast. Portions of the priority ordering so developed may be presented to the viewer for additional selection as in case 1.

One skilled in the art will readily appreciate that there is a great deal of prior art centered on methods for selecting programming for a viewer based on previous viewing history and explicit preferences; e.g., U.S. Pat. No. 5,758,257. The methods described in this application are unique and novel over these techniques as they suggest priorities for the capture of programming, not the broadcast or transmission of programming, and there is no time constraint on when the programming may be broadcast. Further details on these methods are given later in this description.

In general, explicit viewer choices of programming have the highest priority for capture, followed by programming chosen using the preference techniques described herein.

3. A client system will have a small number of inputs capable of receiving television broadcasts or accessing Web pages across a network such as an intranet or the Internet. A scheduling method is used to choose how each input is tuned, and what is done with the resulting captured television signal or Web page.

Figure 6:
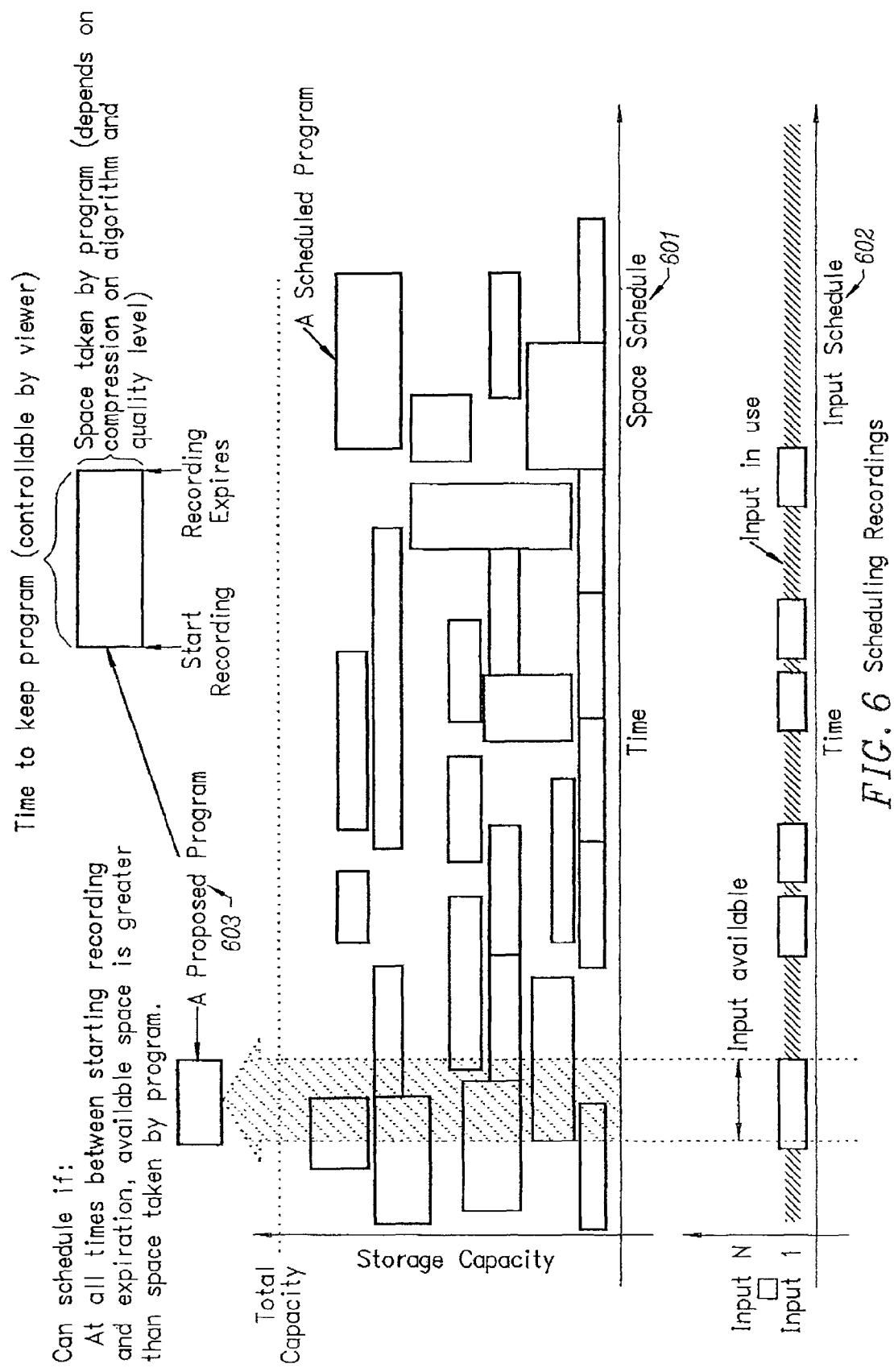
FIG. 6 is a block schematic diagram showing the scheduling of inputs and storage space for making recordings according to the invention.

Referring to FIG. 6, generally, the programs of interest to the viewer may be broadcast at any time, on any channel, as described by the program guide objects. Additionally, the programs of interest may be Web page Universal Resource Locators (URL) across a network, such as an intranet or the Internet. The channel metaphor is used to also describe the location, or URL, of a particular Web site or page.

A viewer, for example, can "tune" into a Web site by designating the Web site URL as a channel. Whenever that channel is selected, the Web site is displayed. A Web page may also be designated as a program of interest and a snapshot of the Web page will be taken and recorded at a predetermined time.

The scheduler accepts as input a prioritized list of program viewing preferences 603, possibly generated as per the cases above. The scheduling method 601 then compares this list with the database of program guide objects 604, which indicate when programs of interest are actually broadcast. It then generates a schedule of time 607 versus available storage space 606 that is optimal for the viewer's explicit or derived preferred programs. Further details on these methods are given later in this description.

4. When a captured program is viewed, the matching program guide object is used to provide additional information about the program, overlaid on the display using any suitable technique, preferably an On Screen Display (OSD) of some form. Such information may include, but is not limited to: program name; time, channel or network of original broadcast; expiration time; running time or other information.

5. When live programming is viewed, the application uses the current time, channel, and channel map to find the matching program guide object. Information from this object is displayed using any suitable technique as described above. The information may be displayed automatically when the viewer changes channels, when a new program begins, on resumption of the program after a commercial break, on demand by the viewer, or based on other conditions.

6. Using techniques similar to those described in case 2, application software may also capture promotional material that may be of interest to the viewer. This information may be presented on viewer demand, or it may be automatically inserted into the output television signal at some convenient point. For example, an advertisement in the broadcast program might be replaced by a different advertisement which has a higher preference priority. Using the time-warping apparatus, such as that described in application Ser. No. 09/126,071, entitled "Multimedia Time Warping System," filed Jul. 30, 1998, it is possible to insert any stored program into the output television signal at any point. The time-warping apparatus allows the overlaid program to be delayed while the stored program is inserted to make this work.

Methods for Generating a List of Preferred Programs

Viewer preferences may be obtained in a number of ways. The viewer may request that certain programs be captured, which results in the highest possible priority for those programs. Alternatively, the viewer may explicitly express preferences using appurtenances provided through the viewer interface, perhaps in response to a promotional spot for a particular program, or even during the viewing of a program. Finally, preferences may be inferred from viewing patterns: programs watched, commercial advertisements viewed or skipped, etc.

In each case, such preferences must correspond to television viewing objects stored in the replicated database. Program objects included a wealth of information about each particular program, for example: title, description, director, producer, actors, rating, etc. These elements are stored as attributes attached to a program object.

Each individual attribute may result in the generation of a preference object. Such objects store the following information:

1. The type of the preference item, such as actor or director preference;

2. The weight of the preference given by the viewer, which might be indicated by multiple button presses or other means;

3. The statically assigned significance of the preference in relation to other preferences, for example, actor preference are more significant than director preferences;

4. The actual value of the preference item, for instance the name of the director.

Figure 5:
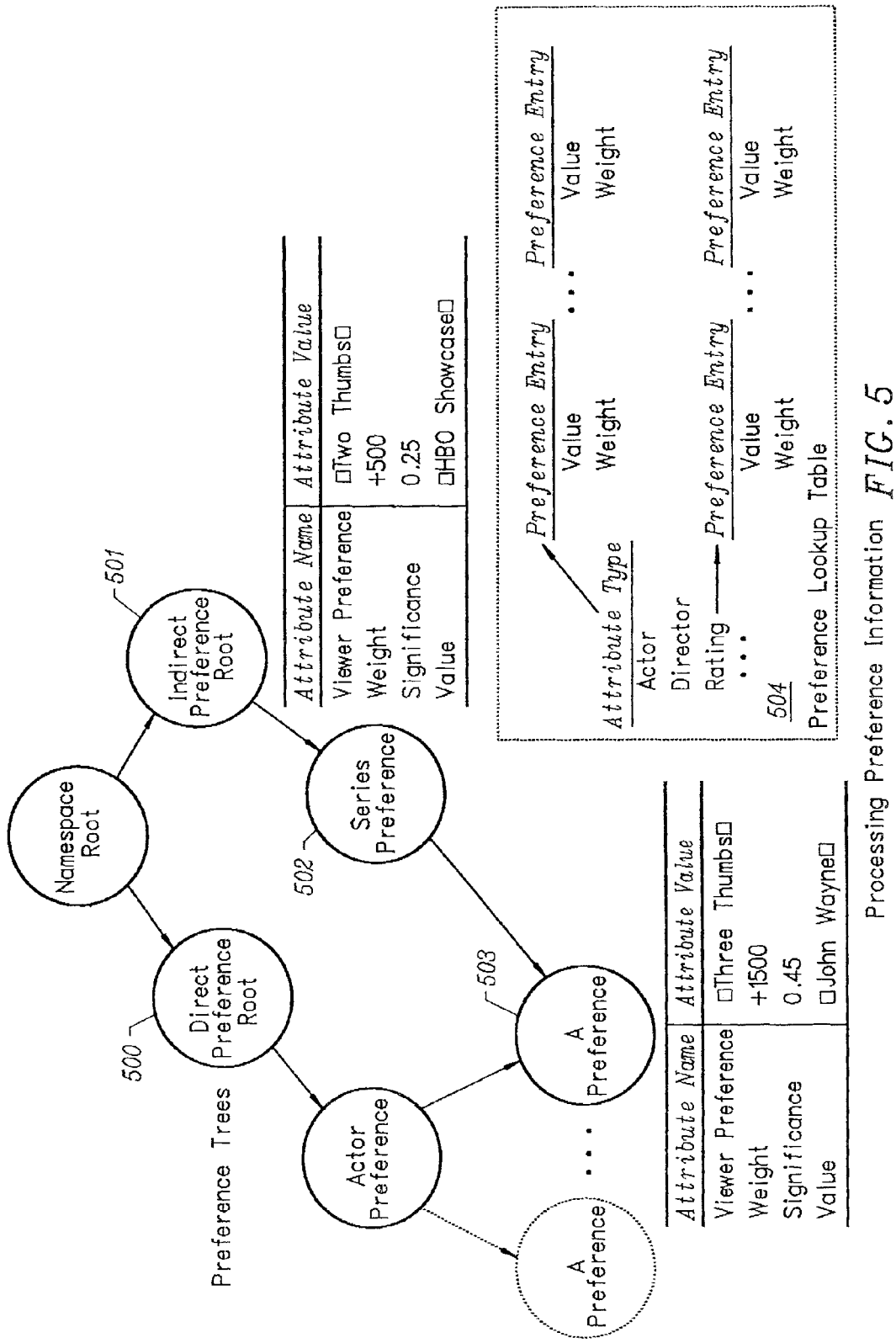
FIG. 5 is a block schematic diagram showing an example graph of relationships generated when processing viewer preferences to determine programs of interest according to the invention.

With respect to FIG. 5, preference objects are stored in the database as a hierarchy similar to that described for program guide objects; however, this hierarchy is built incrementally as preferences are expressed 500. The hierarchy thus constructed is based on "direct" preferences, e.g., those derived from viewer actions or inferred preferences.

A similar hierarchy is developed based on "indirect" preferences pointing to the same preference objects 501. In general, indirect preferences are generated when preferences for aggregate objects are generated, and are used to further weight the direct preferences implied by the collection of aggregated objects. The preference objects referenced through the indirect preference hierarchy are generated or updated by enumerating the available program objects which are part of the aggregate object 502, and generating or updating preference objects for each attribute thus found.

The weight of a particular preference 503 begins at zero, and then a standard value is added based on the degree of preference expressed (perhaps by multiple button presses) or a standard value is subtracted if disinterest has been expressed. If a preference is expressed based on an aggregate viewing object, all preferences generated by all viewing objects subordinate to the aggregated object are similarly weighted. Therefore, a new weighting of relevant preference elements is generated from the previous weighting. This process is bounded by the degree of preference which is allowed to be expressed, thus all weightings fall into a bounded range.

In a preferred embodiment of the invention, non-linear combinations may be used for weighting a preference item. For instance, using statistical models provided by the central site, the client may infer that a heavily weighted preference for three attributes in conjunction indicates that a fourth attribute should be heavily weighted as well.

The list of preferred programs is generated as follows:

1. A table 504 is constructed which lists each possible program object attribute, and any preference objects for that attribute that are present are listed in that entry.

2. If the preference item is a string, such as an actor name, a 32-bit digital signature for that string is calculated using a 32-bit CRC algorithm and stored with the table item, rather than the string itself. This allows for much faster scanning of the table as string comparisons are avoided, at the slight risk of two different strings generating the same digital signature.

3. For each program object in the database, and for each attribute of that program, the attribute is looked up in the table. If present, the list of preference objects for that attribute is examined for a match with the attribute of the current program object. If a match occurs, the weight associated with that preference object is added to weighting associated with the program object to generate a single weight for the program.

4. Finally, the program objects are rank-ordered based on the overall weighting for each program, resulting in a list of most-preferred to least-preferred programs.

Given this final prioritized list, a recording schedule is generated using the methods described below, resulting in a collection of recorded programs of most interest to the viewer.

Methods Applied to Scheduling Recording Versus Available Storage Space

As has been described previously, recorded programs will in general have an expiration date, after which the recorded program is removed from client storage. The viewer may at any time indicate that a program should be saved longer, which delays expiration by a viewer-selected interval. The invention views the available storage for recording programs as a "cache"; unviewed programs are removed after a time, based on the assumption they will not be watched if not watched soon after recording. Viewed programs become immediate candidates for deletion, on the assumption they are no longer interesting.

With proper scheduling of recording and deletion of old programs, it is possible to make a smaller storage area appear to be much larger, as there is an ongoing flushing of old programs and addition of new programs. Additionally, if resources are available, recordings may be scheduled of programs based on inferred preferences of the viewer; these are called "fuzzy" recordings. This results in a system where the program storage area is always "full" of programming of interest to the viewer; no program is removed until another program is recorded in its place or the viewer explicitly deletes it.

Additionally, the viewer may select a program for recording at any time, and the recording window may conflict with other scheduled recordings, or there may not be sufficient space obtainable when the program must be recorded. The invention includes unique and novel methods of resolving such conflicts.

Conflicts can arise for two reasons: lack of storage space, or lack of input sources. The television viewing system described herein includes a fixed number of input sources for recording video and a storage medium, such as a magnetic disk, of finite capacity for storing the recorded video. Recording all television programs broadcast over any significant period of time is not possible. Therefore, resolving the conflicts that arise because of resource limitations is the key to having the correct programs available for viewing.

Referring again to FIG. 6, the invention maintains two schedules, the Space Schedule 601 and the Input Schedule 602. The Space Schedule tracks all currently recorded programs and those which have been scheduled to be recorded in the future. The amount of space available at any given moment in time may be found by generating the sum of all occupied space (or space that will be occupied at that time) and subtracting that from the total capacity available to store programs. Programs scheduled for recording based on inferred preferences ("fuzzy" recordings) are not counted in this calculation; such programs automatically lose all conflict decisions.

A program may be recorded 603 if at all times between when the recording would be initiated and when it expires, sufficient space is available to hold it. In addition, for the duration of the program, there must be an input available from which to record it. The Input Schedule 602 tracks the free and occupied time slots for each input source. In a preferred embodiment of the invention, the input sources may not be used for identical services, e.g., one input may be from a digital television signal and another from an analog television signal with different programming. In this case, only those inputs from which the desired program can be recorded are considered during scheduling.

Figure 7:
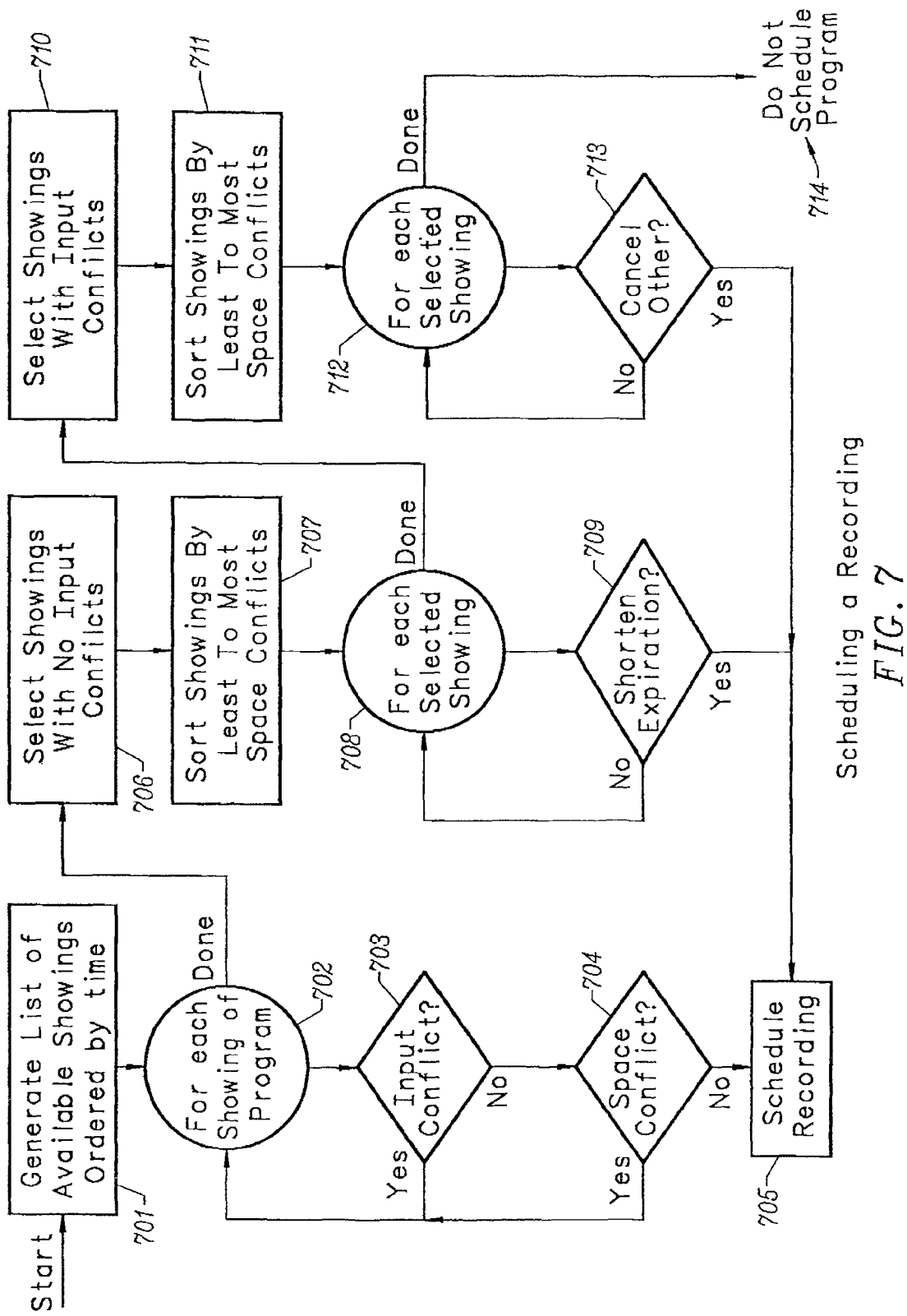
FIG. 7 is a flowchart showing the steps taken to schedule a recording using the mechanism depicted in FIG. 6 according to the invention.

With respect to FIG. 7, a flowchart is shown describing the steps taken to schedule a recording in the preferred embodiment. First, an ordered list of showings of the program of interest are generated 701. Although a preferred embodiment of the invention orders these showings by time, such that the recording is made as soon as possible, any particular ordering might be chosen. Each showing in this list 702 is then checked to see if input 703 or space 704 conflicts occur as described above. If a showing is found with no conflicts, then the program is scheduled for recording 705.

Otherwise, a preferred embodiment of the invention selects only those showings of the program which have no input conflicts 706. Referring again to FIG. 6, one can see that over the lifetime of a recording the amount of available space will vary as other programs are recorded or expire. The list of showings is then sorted, preferably by the minimum amount of available space during the lifetime of the candidate recording. Other orderings may be chosen.

Referring again to FIG. 7, for each candidate showing, the viewer is presented with the option of shortening the expiration dates on conflicting programs 708, 709. This ordering results in the viewer being presented these choices in order from least impact on scheduled programs to greatest 707; there is no requirement of the invention that this ordering be used versus any other.

Should the viewer reject all opportunities to shorten expiration times, the final step involves selecting those showings with input conflicts 710, and sorting these showings as in the first conflict resolution phase 711. The viewer is then presented with the option to cancel each previously scheduled recording in favor of the desired program 712, 713. Of course, the viewer may ultimately decide that nothing new will be recorded 714.

In a preferred embodiment of the invention, all conflicts are resolved as early as possible, giving the viewer more control over what is recorded. When the viewer makes an explicit selection of a program to record, the algorithm described in FIG. 7 is used to immediately schedule the recording and manage any conflicts that arise.

Once an explicit selection has been made, and the viewer informed that the recording will be done, it will not be canceled without explicit approval of the viewer.

Fuzzy recordings are periodically scheduled by a background task on the client device. Given the prioritized list of preferred programs as described earlier, the background scheduler attempts to schedule each preferred program in turn until the list is exhausted or no further opportunity to record is available. A preferred program is scheduled if and only if there are no conflicts with other scheduled programs. A preferred program which has been scheduled may be deleted under two conditions: first, if it conflicts with an explicit selection, and second, if a change in viewer preferences identifies a higher priority program that could be recorded at that time.

A further complication arises when handling aggregate viewing objects for which recording is requested. If conflict resolution was handled according to the method above for such objects, a potentially large number of conflicts might be generated, leading to a confusing and frustrating experience for the viewer in resolving the conflicts. Thus, when aggregate objects are chosen for recording, conflicts are automatically resolved in favor of the existing schedule.

In a preferred embodiment of the invention, conflicts resulting from the recording of aggregate objects will be resolved using the preference weighting of the programs involved; if multiple conflicts are caused by a particular program in the aggregate object, it will only be recorded if its preference exceeds that of all conflicting programs.

Methods Applied to Software Objects

The client system requires a complex software environment for proper operation. An operating system manages the interaction between hardware devices in the client and software applications which manipulate those devices. The television viewing object database is managed by a distinct software application. The time-warping software application is yet another application.

It is desirable to add new features or correct defects in these and other software subsystems which run on the client hardware device. Using the methods described herein, it is possible to replicate viewing objects containing updated software modules into the client system database. Once present in the client system database, the following unique and novel methods are used to install the updated software and cause the client system to begin executing the new software.

The software environment of the device is instantiated as a sequence of steps that occur when power is first applied to the device, each step building up state information which supports proper application of the following step. The last step launches the applications which manage the device and interact with the viewer. These steps are:

1. A read-only or electrically programmable memory in the device holds an initial bootstrap sequence of instructions. These instructions initialize low-level parameters of the client device, initialize the disk storage system, and load a bootstrap loader from the disk into memory, to which execution is then passed. This initial bootstrap may be changed if it resides in an electrically programmable memory.

2. The second stage boot loader then locates the operating system on the disk drive, loads the operating system into memory, and passes execution to the operating system. This loader must exist at a specific location on the disk so as to be easily located by the initial loader.

The operating system performs necessary hardware and software initialization. It then loads the viewing object database software from the disk drive, and begins execution of the application. Other application software, such as the time-warping software and viewer interaction software, are also loaded and started. This software is usually located in a separate area on the disk from the object database or captured television programs.

Ideally, new software would be installed by simply copying it to the appropriate place on the disk drive and rebooting the device. This operation is fraught with danger, especially in a home environment. Power may fail while copying the software, resulting in an inconsistent software image and potential operating problems. The new software may have defects which prevent proper operation. A failure may occur on the disk drive, corrupting the software image.

Although the methods of this invention have referred to a disk drive, one skilled in the art will readily appreciate that the methods described here apply generally to any persistent storage system. A disk drive, and other persistent storage systems, are typically formatted into a sequence of fixed-size blocks, called sectors. "Partitions" are sequential, non-overlapping subsets of this sequence which break up the storage into logically independent areas.

Figure 8:
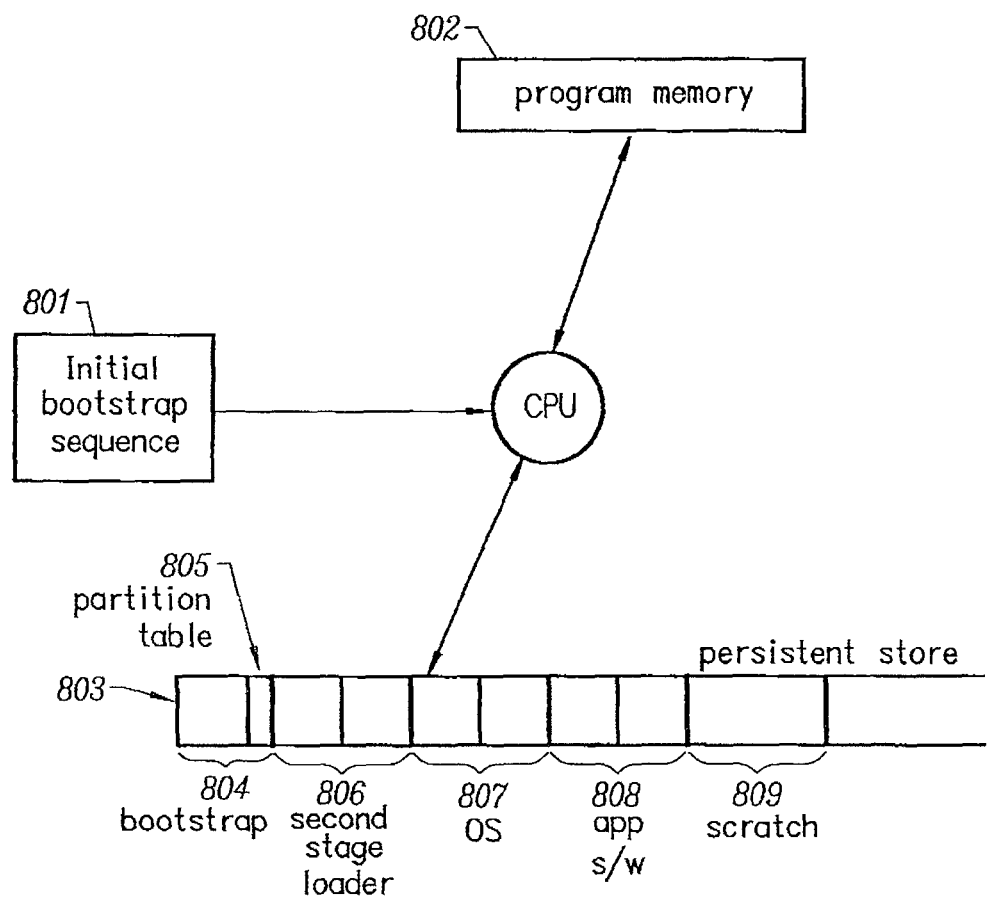
FIG. 8 is a block schematic diagram of a preferred embodiment of the invention showing the bootstrap system configuration according to the invention.

With respect to FIG. 8, the invention maintains a sector of information at a fixed location on the disk drive 803 called the "boot sector" 804. The boot sector 804 contains sufficient information for the initial bootstrap 801 to understand the partitioning of the drive 803, and to locate the second stage boot loader 806.

The disk is partitioned into at least seven (7) partitions. There are two (2) small partitions dedicated to holding a copy of the second stage boot loader 806, two (2) partitions holding a copy of the operating system kernel 807, two (2) partitions containing a copy of the application software 808, and a partition to be used as scratch memory 809. For duplicated partitions, an indication is recorded in the boot sector 805 in which one of the partitions is marked "primary", and the second is marked "backup".

One skilled in the art will readily appreciate that, although two partitions are described herein for redundancy, triple, quadruple or greater degrees of redundancy can be achieved by creating more duplicated partitions.

Figure 9A:
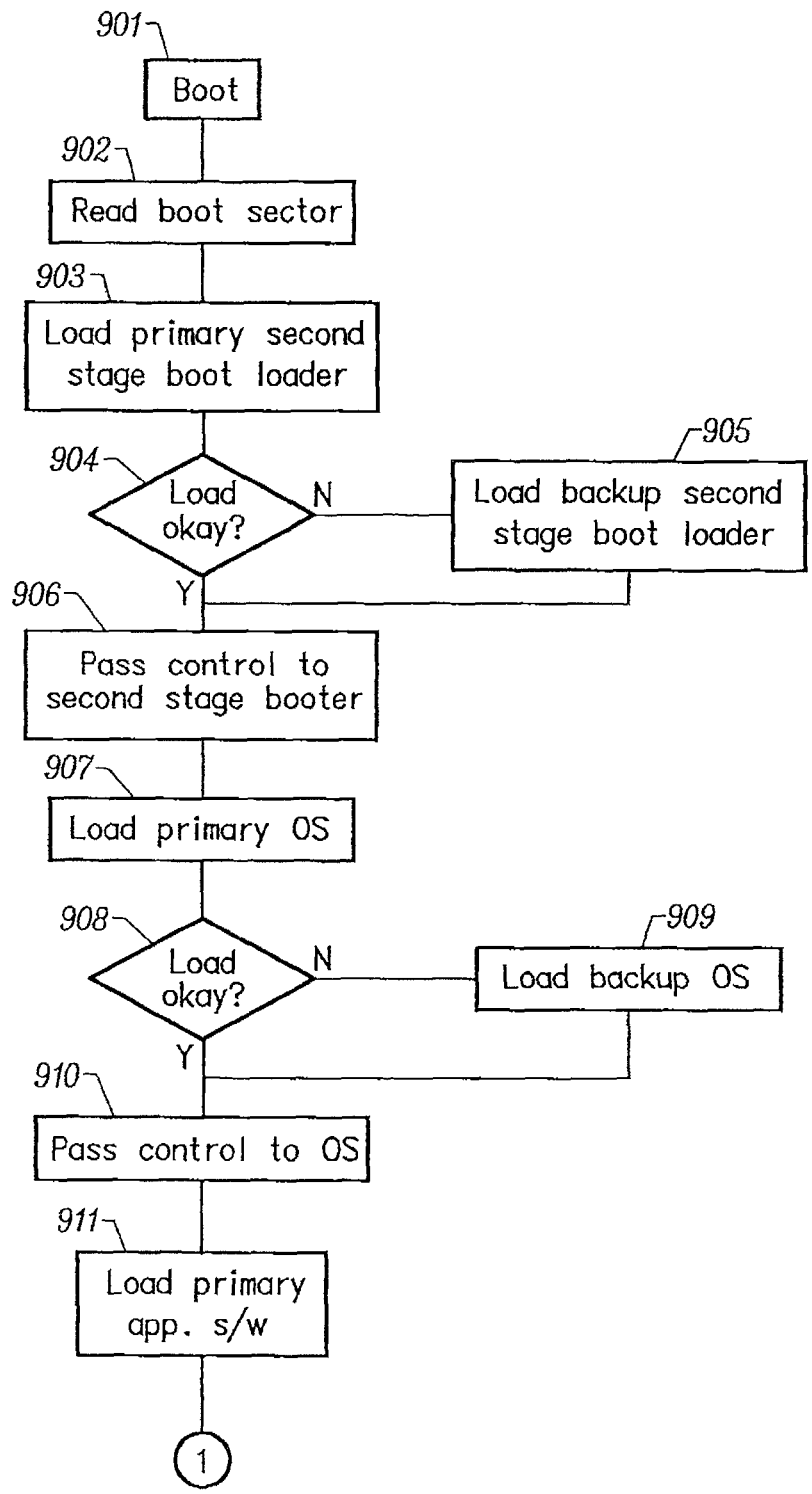
FIG. 9A is a block schematic diagram of the decision flowchart for the bootstrap component according to the invention.
Figure 9B:
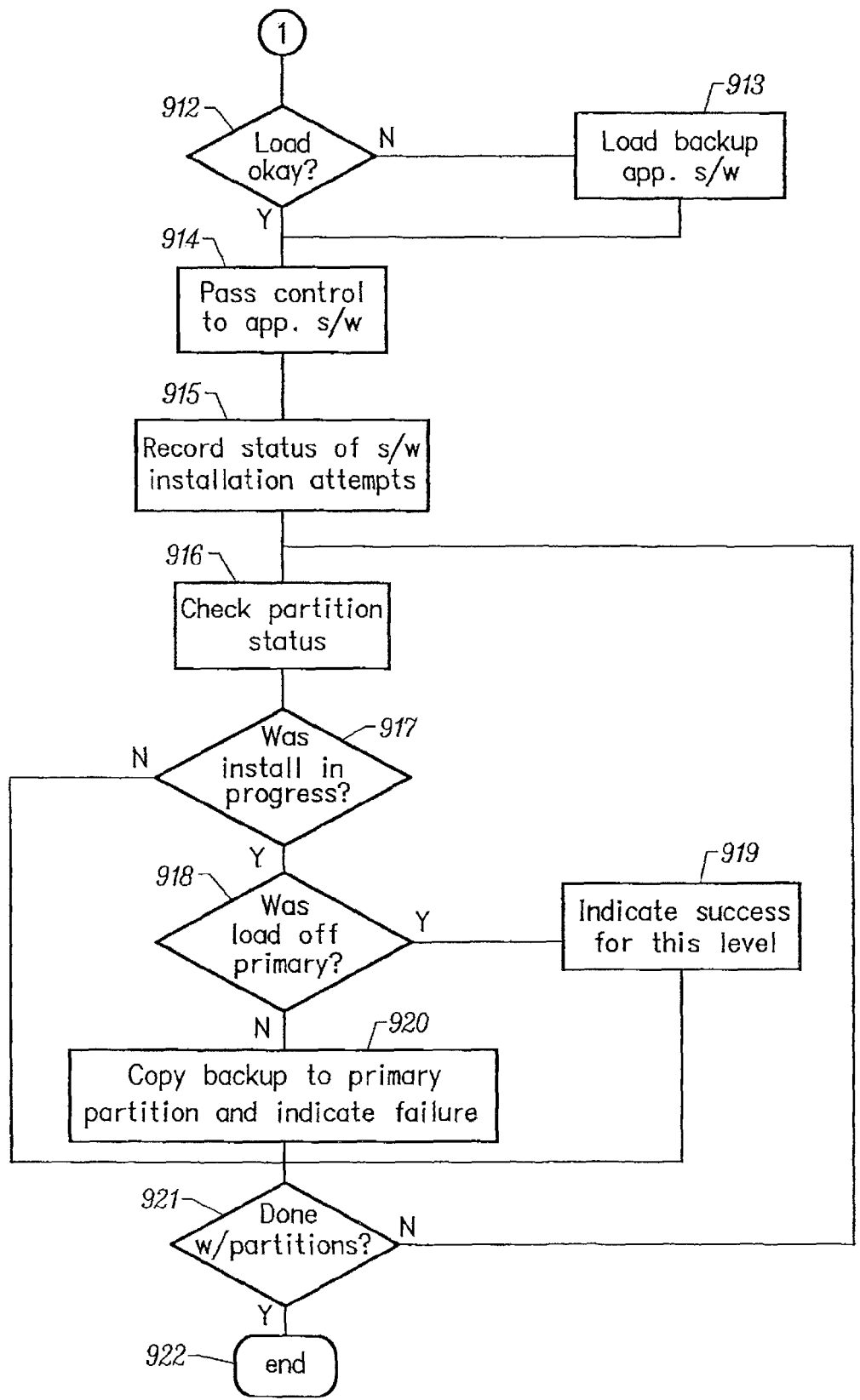
FIG. 9B is a block schematic diagram of the decision flowchart for the bootstrap component according to the invention.

With respect to FIGS. 9A and 9B, on boot 901, the initial bootstrap code reads the boot sector 902, scans the partition table and locates the "primary" partition for the second stage boot loader. It then attempts to load this program into memory 903. If it fails 904, for instance, due to a failure of the disk drive, the boot loader attempts to load the program in the "backup" partition into memory 905. Whichever attempt succeeds, the boot loader then passes control to the newly loaded program, along with an indication of which partition the program was loaded from 906.

Similarly, the second stage boot loader reads the partition table and locates the "primary" operating system kernel 907. If the kernel can not be loaded 908, the "backup" kernel is loaded instead 909. In any case, control is passed to the operating system along with an indication of the source partition, along with the passed source partition from above 910.

Finally, the operating system locates the "primary" partition containing application software and attempts to load the initial application 911. If this fails 912, then the operating system locates the "backup" partition and loads the initial application from it 913. An indication of the source partition is passed to the initial application, along with the source partition information from the previous steps. At this point, application software takes over the client system and normal viewing management behavior begins 914.

This sequence of operations provides a reasonable level of protection from disk access errors. It also allows for a method which enables new software at any of these levels to be installed and reliably brought into operation.

An "installer" viewing object in the object database is used to record the status of software installation attempts. It records the state of the partitions for each of the three levels above, including an indication that an attempt to install new software is underway 915. This operation is reliable due to the transactional nature of the database.

Figure 10:
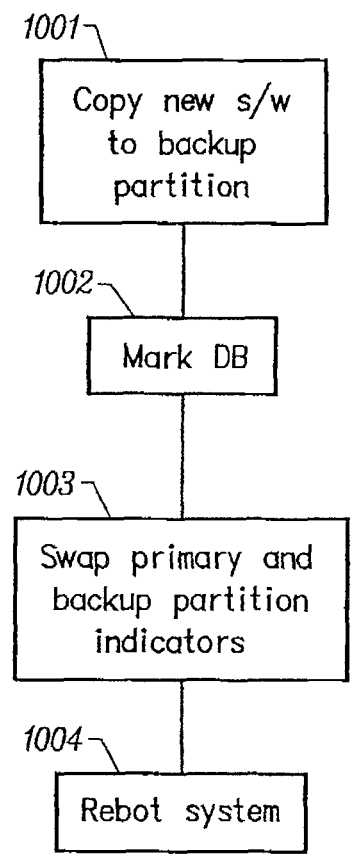
FIG. 10 is a block schematic diagram of the decision flowchart for the software installation procedure according to the invention.

Referring to FIG. 10, installing a new software image at any of the three levels is handled as follows: the new software image is first copied into the appropriate backup partition 1001, and an indication is made in the database that a software installation is underway 1002. The primary and backup partition indications in the partition table are then swapped 1003, and the system rebooted 1004. Eventually, control will be passed to the initial application.

Referring again to FIG. 9B, the first task of this application is to update the installer object. For each level 921, 922, the application checks if an installation was in process 916, 917, and verifies that the level was loaded off of the primary partition 918. If so, the installation at that level was successful, and the installer object is updated to indicate success for that level 919. Otherwise, the application copies the backup partition for that level over the primary partition and indicates failure in the installer object for that level 920. Copying the partition insures that a backup copy of known good software for a level is kept available at all times.

In a preferred embodiment of the invention, finalization of the installation for the top application level of software may be delayed until all parts of the application environment have been successfully loaded and started. This provides an additional level of assurance that all parts of the application environment are working properly before permanently switching to the new software.

Methods Applied to Operations Status Objects

Operations status objects are a class of viewing object in which information about the usage, performance and behavior of the client system is recorded. These objects are collected by the central site whenever communication with the central site is established.

The following operations status indicators are recorded for later collection along with a time stamp:

1. Viewer actions, primarily pressing buttons on a remote control device, are recorded. Each "button press" is recorded along with the current time, and any other contextual information, such as the current viewer context. Post-processing of this object at the central site results in a complete trace of viewer actions, including the context in which each action is taken.

2. Automatic actions, such as beginning or ending the recording of a program, or choosing a program to record based on viewer preferences, are recorded. In addition, deletion of captured programs is recorded. Post-processing of this object at the central site results in a complete trace of program capture actions taken by the client system, including the programs residing in the persistent store at any point in time.

3. Software installation actions, including reception, installation, and post-reboot results are recorded.

4. Hardware exceptions of various kinds, including but not limited to: power fail/restart, internal temperature profile of the device, persistent storage access errors, memory parity errors and primary partition failures.

Since all actions are recorded along with a time stamp, it is possible to reconstruct the behavior of the client system using a linear time-based ordering. This allows manual or automatic methods to operate on the ordered list of events to correlate actions and behaviors. For instance, if an expected automatic action does not occur soon after rebooting with new software, it may be inferred that the new software was defective.

Processing of Television Viewing Objects by Central Site Systems

Sources of Television Viewing Objects

A client system has a single source of television viewing objects: the central site. The central site object database has many sources of television viewing objects:

1. Program guide information obtained from outside sources is processed to produce a consistent set of program guide objects, indicating "programs", "showings", "channels", "networks" and other related objects. This set of objects will have dependencies ("channels" depend on "networks", "showings" depend on "programs") and other interrelationships. When a complete, consistent set of objects is ready, it is added to the database as an atomic operation.

2. New software, including new applications or revisions of existing software, are first packaged into "software" viewing objects. As above, the software may have interdependencies, such as an application depending on a dynamically loaded library, which must be reflected in the interrelationships of the software objects involved. In another example, there may be two types of client systems in use, each of which requires different software objects; these software objects must have attributes present indicating the type of system they are targeted at. Once a consistent set of objects is available, it is added to the database as an atomic operation.

3. Each client system has a unique, secret key embedded within it. The public key matching this secret key is loaded into a "client" management object, along with other interesting information about the client, such as client type, amount of storage in the system, etc. These objects are used to generate authentication objects as necessary.

4. Aggregation program guide objects are added in a similar fashion. In this case, however, the aggregation object must refer to primitive program guide objects already present in the database. Also attached to the aggregation object are other objects, such as a textual description, a screen-based icon, and other informational attributes. Once a consistent set of ancillary objects to the aggregation is available, it is added to the database as an atomic operation.

5. Data collected from client systems. It should be clear that there may be any number of sources of viewing objects, and this enumeration simply shows the most basic possible sources.

Operations on Television Viewing Objects

There are a large number of possible operations on the central television viewing object database. The following examples are meant to show the type of processing that may be performed, however the potential operations are not limited to these examples:

1. Using various viewing objects, a number of interesting statistical analysis tasks may be performed:

1.1. By examining large numbers of uploaded operations status objects, it is possible to perform extensive analysis of hardware reliability trends and failure modes. For instance, it is possible to correlate internal temperature with expected MTBF (Mean Time Between Failures) of client devices.

1.2. By examining large numbers of uploaded viewing information, it is possible to derive demographic or psychographic information about various populations of client devices. For example, it is possible to correlate TV programs most watched within specific zip codes in which the client devices reside.

1.3. Similarly, by examining large numbers of viewing information objects, it is possible to generate "rating" and "share" values for particular programs with fully automated methods, unlike existing program rating methods.

1.4. There are many other examples of statistical analysis tasks that might be performed on the viewing object database; these examples are not meant to limit the applicability of the invention, but to illustrate by example the spectrum of operations that might be performed.

2. Specialty aggregation objects may be automatically generated based on one or more attributes of all available viewing objects.

Such generation is typically performed by first extracting information of interest from each viewing object, such as program description, actor, director, etc., and constructing a simple table of programs and attributes. An aggregate viewing object is then generated by choosing one or more attributes, and adding to the aggregate those programs for which the chosen attributes match in some way.

These objects are then included in the slices generated for transmission, possibly based on geographic or other information. Some example aggregates that might be created are:

2.1. Aggregates based on events, such as a major league football game in a large city. In this case, all programs viewable by client devices in or around that city are collected, and the program description searched for the names of the teams playing, coaches names, major player's names, the name of the ballpark, etc. Matching program objects are added to the aggregate, which is then sliced for transmission only to client devices in regions in and around the city.

2.2. Aggregates based on persons of common interest to a large number of viewers. For instance, an aggregate might be constructed of all "John Wayne" movies to be broadcast in the next week.

2.3. Aggregates based on viewing behavior can be produced. In this case, uploaded viewing objects are scanned for elements of common interest, such as types of programs viewed, actual programs viewed, etc. For example, a "top ten list" aggregate of programs viewed on all client devices in the last week might be generated containing the following week's showing of those programs.

2.4. Aggregates based on explicit selections by viewers. During viewing of a program, the viewer might be presented with an opportunity to "vote" on the current program, perhaps on the basis of four perceived attributes (storyline, acting, directing, cinematography), which generates viewing objects that are uploaded later. These votes are then scanned to determine an overall rating of the program, which is transmitted to those who voted for their perusal.

2.5. There are many other examples of how the basic facilities of this invention allow the service operator to provide pre-sorted and pre-selected groups of related programs to the user of the client device for perusal and selection. These examples are not meant to limit the applicability of the invention, but to illustrate by example the spectrum of operations that might be performed.

3. Manual methods may also be used to generate aggregate objects, a process sometimes called "authoring". In this case, the person creating the aggregate chooses programs for explicit addition to the aggregate. It is then transmitted in the same manner as above.

Clearly, aggregation program objects may also permit the expression of preferences or recording of other information. These results may be uploaded to the central site to form a basis for the next round of aggregate generation or statistical analysis, and so on.

This feedback loop closes the circuit between service provider and the universe of viewers using the client device. This unique and novel approach provides a new form of television viewing by providing unique and compelling ways for the service provider to present and promote the viewing of television programs of interest to individuals while maintaining reliable and consistent operation of the service.

Adjusting Scheduled Recordings

Many external forces affect the actual airing of broadcast programs. For example, local stations have a tendency to broadcast programs early or late and sports broadcasts often run into overtime. The fact that programs are scheduled to be broadcast at specific times never takes in to account these external forces. Viewers often miss the first few minutes of their favorite programs or the end of a cliffhanger that won't be rerun until the beginning of the next season.

Figure 11:
FIG. 11 is a diagram of a screenshot of an electronic broadcast program guide according to the invention.
Figure 12:
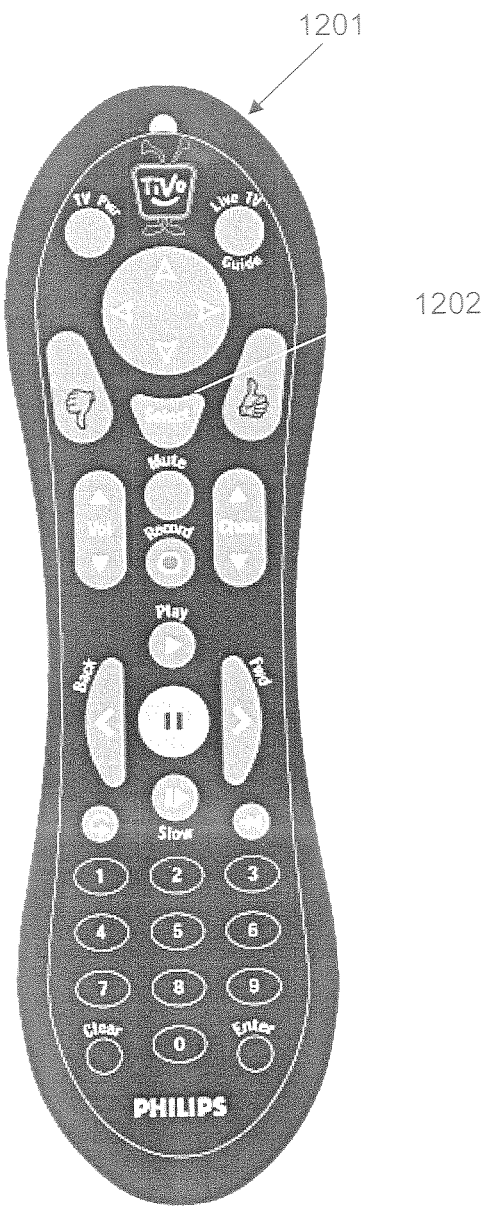
FIG. 12 is a schematic diagram of a remote input device according to the invention.

Referring to FIGS. 11 and 12, an on screen program guide 1101 is displayed to the viewer. The viewer selects a program listing from the program guide 1101 by highlighting a particular program 1103 for a particular start time 1102 using a remote input device 1201. The program guide 1101 lists the scheduled start 1104 and end 1105 times of each program that is scheduled to be broadcast on the channels available to the viewer. The viewer then presses a select button 1202, for example, to select the program for recording.

Figure 13:
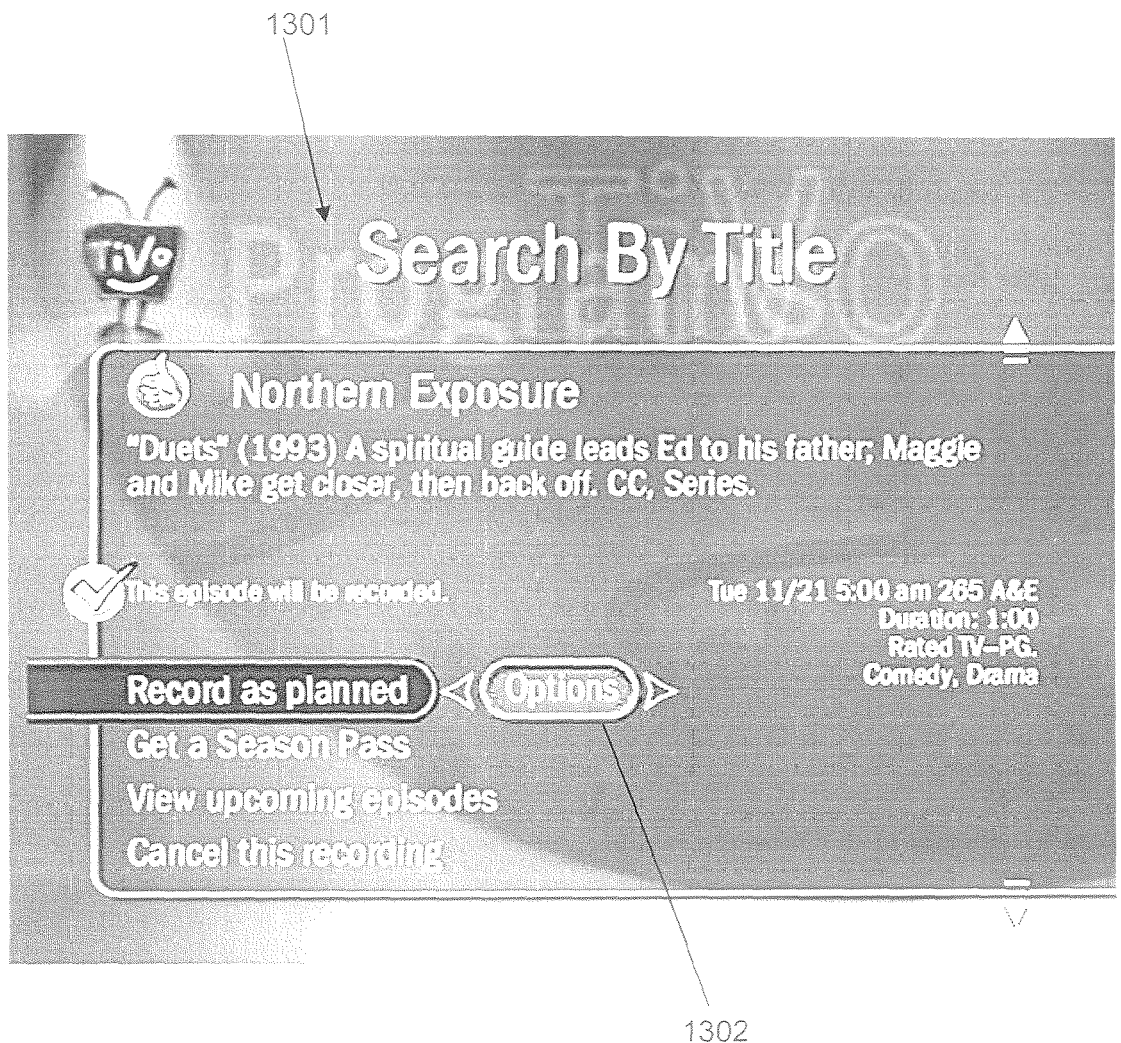
FIG. 13 is a diagram of a screenshot of a recording options access screen according to the invention.

With respect to FIG. 13, a preferred embodiment of the invention displays a recording screen 1301. The recording screen allows the viewer to select the options 1302 desired for the particular program.

Figure 14:
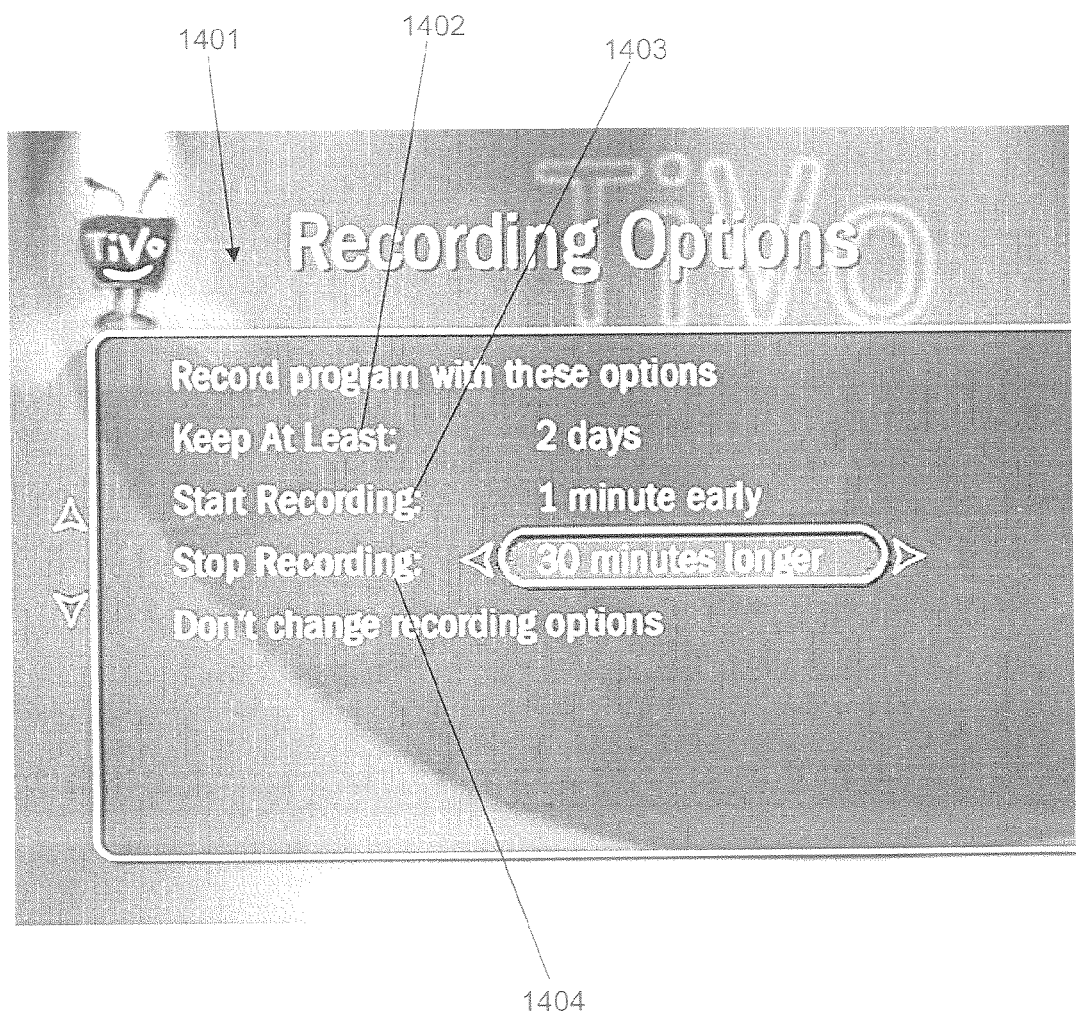
FIG. 14 is a diagram of a screenshot of a recording options user interface screen according to the invention.

Referring to FIG. 14, the recording options screen 1401 displays the options for adjusting the scheduler's recording schedule for the program. The viewer can specify the minimum number of days 1402 that he wants to keep the program stored on the persistent store.

The viewer adjusts the start time of the recording by entering the relative time increment (minutes, hours, or seconds) 1403, or underrun, that is added (later recording, e.g., "x minutes longer") or subtracted (earlier recording, e.g., "y minutes early"—in this example, "1 minute early" is displayed) from the posted start time of the program. The end time of the recording is also adjustable by the viewer. The viewer indicates the relative time increment (minutes, hours, or seconds) 1404, or overrun, that is added (later completion, e.g., "x minutes longer"—in this example, 30 minutes longer is displayed) or subtracted (earlier completion, e.g., "y minutes early") from the posted end time of the program. In this example, the relative time increment can be entered in the entry fields 1403, 1404, (e.g., 1 minute early, 30 minutes longer) while the start time of the recording and/or end time of the recording may not be entered using the entry fields 1403, 1404, as the time increments entered in the entry fields 1403, 1404, are relative. The viewer can increase or decrease the time increment in the selected entry field, for example, entry field 1404, using the arrows on the remote control 1201 as indicated 1405, 1406, in the vicinity of the entry field 1404 when the entry field is selected.

The scheduler allows the viewer to obtain a season pass for a series of programs such as soap operas and comedy series. A season pass indicates that the scheduler will schedule a recording of the program each time it is aired on a particular station.

Figure 15:
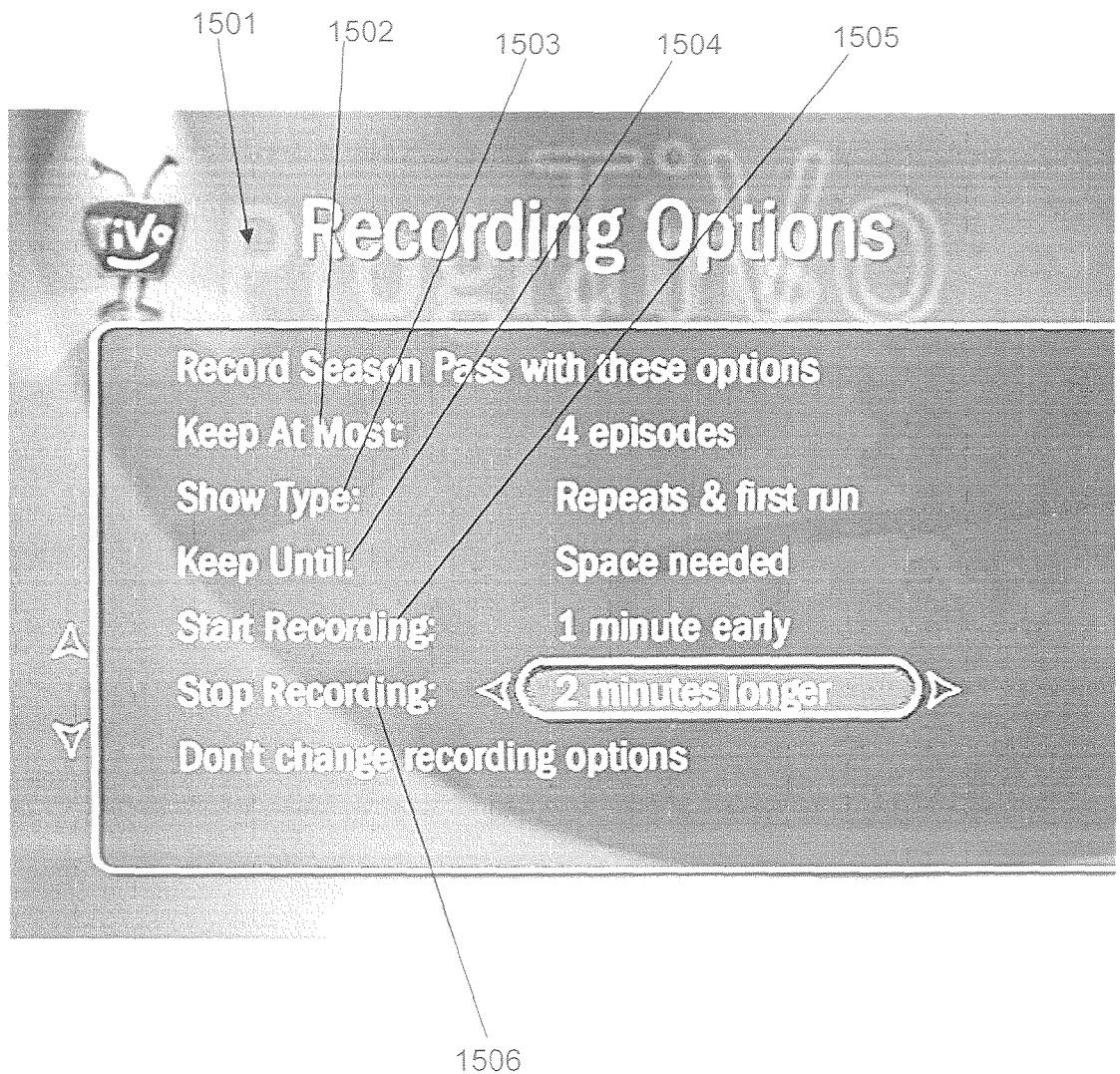
FIG. 15 is a diagram of a screenshot of a season pass recording options user interface screen according to the invention.

With respect to FIG. 15, the viewer indicates his desired recording options through the recording options screen 1501. The viewer indicates the maximum number of episodes 1502 of the program that he wants stored in the persistent store. The types of shows recorded 1503, e.g., first runs, repeats, or first runs and repeats, is modifiable by the viewer. The duration that the recorded programs are kept in the persistent store 1504 can also be specified by the viewer.

The viewer adjusts the start times of all of the season pass recordings by entering the relative time increment (minutes, hours, or seconds) 1505 that is added (later recording, e.g., "x minutes longer") or subtracted (earlier recording, e.g., "y minutes early"—in this example, "1 minute early" is displayed) from the posted start times of the programs. The end times of all of the season pass recordings are also adjustable by the viewer. The viewer indicates the relative time increment (minutes, hours, or seconds) 1506 that is added (later completion, e.g., "x minutes longer"—in this example, 30 minutes longer is displayed)) or subtracted (earlier completion, e.g., "y minutes early") from the posted end times of the programs. In this example, the time increment can be entered in the entry fields 1505, 1506, (e.g., 1 minute early, 30 minutes longer) while the start times of all of the season pass recordings and/or end times of all of the season pass recordings may not be entered using the entry fields 1505, 1506, as the time increments entered in the entry fields 1505, 1506, are relative. The viewer can increase or decrease the time increment in the selected entry field, for example, entry field 1506, using the arrows on the remote control 1201 as indicated 1507, 1508, in the vicinity of the entry field 1506 when the entry field is selected.

The invention allows the viewer to adjust the amount of time added or subtracted to the end time while the program is being recorded. This gives the viewer the flexibility to adapt to, for example, football games that go into overtime.

Figure 16:
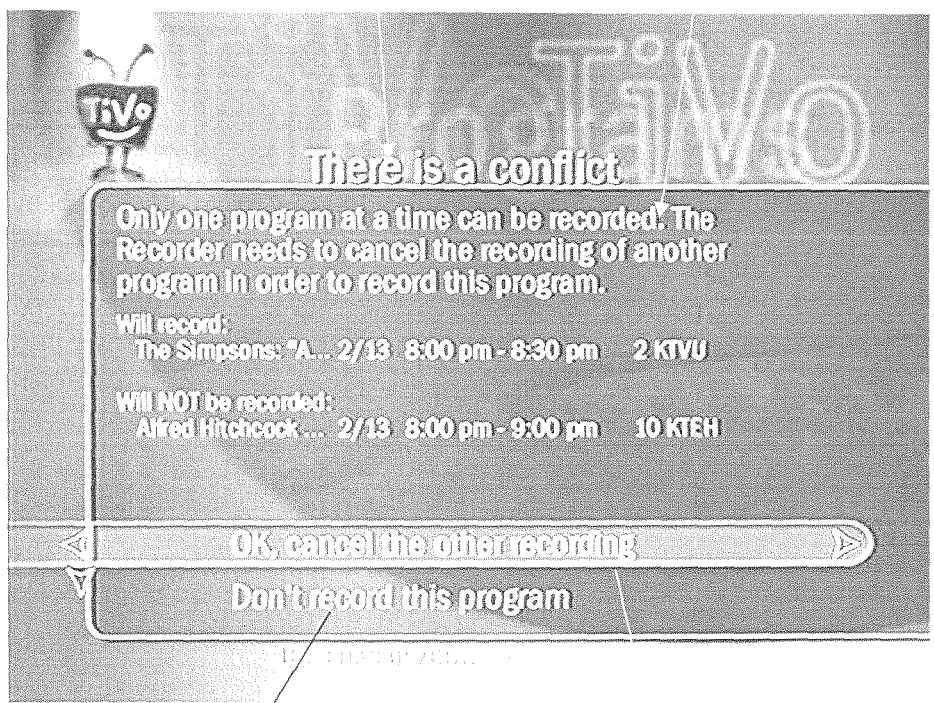
FIG. 16 is a diagram of a screenshot of a recording conflict screen according to the invention.

Referring to FIG. 16, any conflicts that occur between the scheduling of a program or season pass recording with other programs or season passes scheduled for recording are found by the scheduler (as previously described). The scheduler indicates to the viewer that a conflict has occurred 1601. Conflicting programs and/or season passes are listed to the viewer 1602. The viewer then decides to cancel the conflicting scheduled recordings 1603 or to not record the present program 1604.

Figure 17:
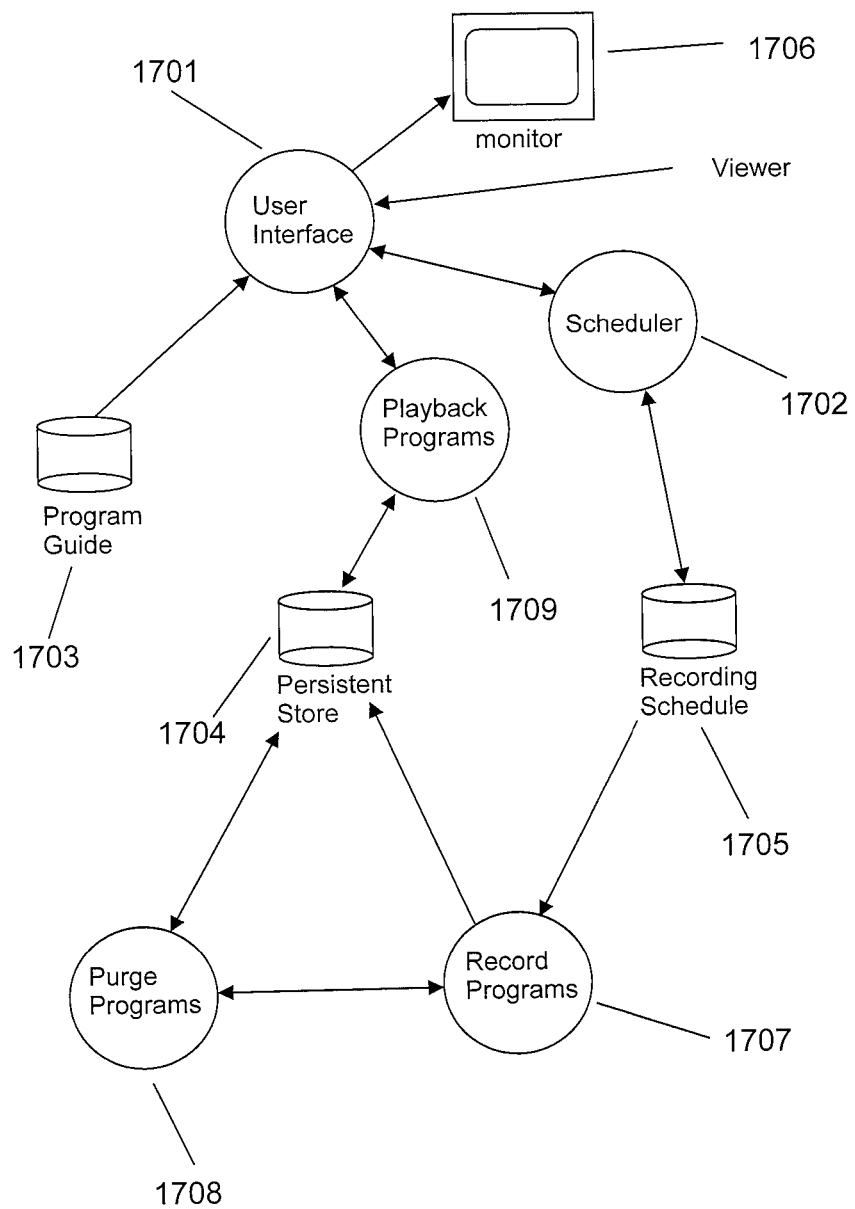
FIG. 17 is a block schematic diagram of a high level task viewpoint of a preferred embodiment of the invention according to the invention.

With respect to FIG. 17, a high level task viewpoint of a preferred embodiment of the invention is shown. The User Interface module 1701 accepts commands from the viewer via an input device. Program Guide data 1703 are organized and displayed to the viewer by the User Interface module 1701. The Program Guide data 1703 contains program listings, show times, and input sources (e.g., channels, satellite or cable input source, etc.). Command screens and program guides are displayed by the User Interface 1701 to the viewer through the television or display monitor 1706. The viewer selects programs to record from the displayed program guide.

The Scheduler module 1702 maintains the Recording Schedule database 1705. The Scheduler module 1702 accepts program recording schedules and recording option parameters from the viewer through the User Interface module 1701. Acceptable program recording schedules are stored into the Recording Schedule database 1705 by the Scheduler module 1702. The Scheduler module notifies the viewer of any recording schedule conflicts through the User Interface module 1701.

Program recordings are performed by the Record Programs module 1707. The Record Programs module 1707 looks at the Recording Schedule database 1705 to find the time and input channel that is next to be recorded. As each program recording time comes up, the Record Programs module 707 records the program, by storing it in the Persistent Store 1704. Program information such as the title, program description, and storage duration are stored with the program recording in the Persistent Store 1704.

In the case of the invention being implemented in a digital video recorder (DVR), the program is stored in digital form in the persistent store. The viewer can randomly play any program stored in the persistent store.

The Purge Programs module 1708 constantly checks the programs stored in the Persistent Store 1704 for expiration dates. Programs are removed from the Persistent Store 704 by the Purge Programs module 1708 whenever the program's storage duration expires or the Record Programs module 1707 finds that it needs more room on the Persistent Store 1704 to store new program recordings.

The viewer accesses the programs stored in the Persistent Store 1704 via the Playback Programs module 1709. The Playback Programs module 1709 plays the requested stored program from the Persistent Store 1704 to the viewer via the User Interface module 1701.

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method, comprising:
   displaying at least one input screen to a user that contains an entry field that allows the user to specify a relative amount of time in the entry field to adjust a program's start availability time, the relative amount of time is displayed in the entry field in response to the user specifying the relative amount of time to adjust the program's start availability time, the program having a start availability time and an end availability time listed in an electronic program guide;
   scheduling a start recording time and end recording time for the program using the program's start availability time and end availability time, the scheduling step adjusting the scheduled start recording time for the program using the relative amount of time specified by the user in the entry field;
   recording the program on at least one storage device in a digital format.

2. The method of claim 1, further comprising:
   displaying a program guide to the user;
   wherein the program guide lists scheduled availability times of a plurality of programs; and
   wherein the program is selected for recording from the program guide.

3. The method of claim 1, wherein the user is allowed to specify a desired amount of time to be added or subtracted to/from the scheduled end recording time while the program is being recorded.

4. The method of claim 1, wherein the user is allowed to specify a length of time the program is retained on the at least one storage device.

5. The method of claim 1, further comprising:
   playing the program stored on the at least one storage device to the user.

6. The method of claim 1, further comprising:
creating a recording schedule for programs scheduled to be recorded;
wherein the recording schedule contains program identifiers and start and end times of programs to be recorded; and
wherein the program recording step records programs on the at least one storage device according to the recording schedule.

7. An apparatus, comprising:
a subsystem, implemented at least partially in hardware, that displays at least one input screen to a user that contains an entry field that allows the user to specify a relative amount of time in the entry field to adjust a program's start availability time, the relative amount of time is displayed in the entry field in response to the user specifying the relative amount of time to adjust the program's start availability time, the program having a start availability time and an end availability time listed in an electronic program guide;
a subsystem, implemented at least partially in hardware, that schedules a start recording time and end recording time for the program using the program's start availability time and end availability time, the scheduling step adjusting the scheduled start recording time for the program using the relative amount of time specified by the user in the entry field;
a subsystem, implemented at least partially in hardware, that records the program on at least one storage device in a digital format.

8. The apparatus of claim 7, further comprising:
a subsystem, implemented at least partially in hardware, that displays a program guide to the user;
wherein the program guide lists scheduled availability times of a plurality of programs; and
wherein the program is selected for recording from the program guide.

9. The apparatus of claim 7, wherein the user is allowed to specify a desired amount of time to be added or subtracted to/from the scheduled end recording time while the program is being recorded.

10. The apparatus of claim 7, wherein the user is allowed to specify a length of time the program is retained on the at least one storage device.

11. The apparatus of claim 7, further comprising:
a subsystem, implemented at least partially in hardware, that plays the program stored on the at least one storage device to the user.

12. The apparatus of claim 7, further comprising:
a recording schedule;
wherein the recording schedule contains program identifiers and start and end times of programs to be recorded; and
wherein the program recording subsystem records programs on the at least one storage device according to the recording schedule.

13. A non-transitory computer readable medium storing instructions that, when executed by one or more devices, cause performance of:
displaying at least one input screen to a user that contains an entry field that allows the user to specify a relative amount of time in the entry field to adjust a program's start availability time, the relative amount of time is displayed in the entry field in response to the user specifying the relative amount of time to adjust the program's start availability time, the program having a start availability time and an end availability time listed in an electronic program guide;
scheduling a start recording time and end recording time for the program using the program's start availability time and end availability time, the scheduling step adjusting the scheduled start recording time for the program using the relative amount of time specified by the user in the entry field;
recording the program on at least one storage device in a digital format.

14. The computer readable medium of claim 13, further comprising:
displaying a program guide to the user;
wherein the program guide lists scheduled availability times of a plurality of programs; and
wherein the program is selected for recording from the program guide.

15. The computer readable medium of claim 13, wherein the user is allowed to specify a desired amount of time to be added or subtracted to/from the scheduled end recording time while the program is being recorded.

16. The computer readable medium of claim 13, wherein the user is allowed to specify a length of time the program is retained on the at least one storage device.

17. The computer readable medium of claim 13, further comprising:
playing the program stored on the at least one storage device to the user.

18. The computer readable medium of claim 13, further comprising:
creating a recording schedule for programs scheduled to be recorded;
wherein the recording schedule contains program identifiers and start and end times of programs to be recorded; and
wherein the program recording subsystem records programs on the at least one storage device according to the recording schedule.

19. A method, comprising:
displaying at least one input screen to a user that contains an entry field that allows the user to specify a relative amount of time in the entry field to adjust a program's end availability time, the relative amount of time is displayed in the entry field in response to the user specifying the relative amount of time to adjust the program's end availability time, the program having a start availability time and an end availability time listed in an electronic program guide;
scheduling a start recording time and end recording time for the program using the program's start availability time and end availability time, the scheduling step adjusting the scheduled end recording time for the program using the relative amount of time specified by the user in the entry field;
recording the program on at least one storage device in a digital format.

20. The method of claim 19, further comprising:
displaying a program guide to the user;
wherein the program guide lists scheduled availability times of a plurality of programs; and
wherein the program is selected for recording from the program guide.

21. The method of claim 19, wherein the user is allowed to specify a desired amount of time to be added or subtracted to/from the scheduled end recording time while the program is being recorded.

22. The method of claim 19, wherein the user is allowed to specify a length of time the program is retained on the at least one storage device.

23. The method of claim 19, further comprising:
playing the program stored on the at least one storage device to the user.

24. The method of claim 19, further comprising:
creating a recording schedule for programs scheduled to be recorded;
wherein the recording schedule contains program identifiers and start and end times of programs to be recorded; and
wherein the program recording step records programs on the at least one storage device according to the recording schedule.

25. An apparatus, comprising:
a subsystem, implemented at least partially in hardware, that displays at least one input screen to a user that contains an entry field that allows the user to specify a relative amount of time in the entry field to adjust a program's end availability time, the relative amount of time is displayed in the entry field in response to the user specifying the relative amount of time to adjust the program's end availability time, the program having a start availability time and an end availability time listed in an electronic program guide;
a subsystem, implemented at least partially in hardware, that schedules a start recording time and end recording time for the program using the program's start availability time and end availability time, the scheduling subsystem adjusting the scheduled end recording time for the program using the relative amount of time specified by the user in the entry field;
a subsystem, implemented at least partially in hardware, that records the program on at least one storage device in a digital format.

26. The apparatus of claim 25, further comprising:
a subsystem, implemented at least partially in hardware, that displays a program guide to the user;
wherein the program guide lists scheduled availability times of a plurality of programs; and
wherein the program is selected for recording from the program guide.

27. The apparatus of claim 25, wherein the user is allowed to specify a desired amount of time to be added or subtracted to/from the scheduled end recording time while the program is being recorded.

28. The apparatus of claim 25, wherein the user is allowed to specify a length of time the program is retained on the at least one storage device.

29. The apparatus of claim 25, further comprising:
a subsystem, implemented at least partially in hardware, that plays the program stored on the at least one storage device to the user.

30. The apparatus of claim 25, further comprising:
a recording schedule;
wherein the recording schedule contains program identifiers and start and end times of programs to be recorded; and
wherein the program recording subsystem records programs on the at least one storage device according to the recording schedule.

31. A non-transitory computer readable medium storing instructions that, when executed by one or more devices, cause performance of:
displaying at least one input screen to a user that contains an entry field that allows the user to specify a relative amount of time in the entry field to adjust a program's end availability time, the relative amount of time is displayed in the entry field in response to the user specifying the relative amount of time to adjust the program's end availability time, the program having a start availability time and an end availability time listed in an electronic program guide;
scheduling a start recording time and end recording time for the program using the program's start availability time and end availability time, the scheduling step adjusting the scheduled end recording time for the program using the relative amount of time specified by the user in the entry field;
recording the program on at least one storage device in a digital format.

32. The computer readable medium of claim 31, further comprising:
displaying a program guide to the user;
wherein the program guide lists scheduled availability times of a plurality of programs; and
wherein the program is selected for recording from the program guide.

33. The computer readable medium of claim 31, wherein the user is allowed to specify a desired amount of time to be added or subtracted to/from the scheduled end recording time while the program is being recorded.

34. The computer readable medium of claim 31, wherein the user is allowed to specify a length of time the program is retained on the at least one storage device.

35. The computer readable medium of claim 31, further comprising:
playing the program stored on the at least one storage device to the user.

36. The computer readable medium of claim 31, further comprising:
creating a recording schedule for programs scheduled to be recorded;
wherein the recording schedule contains program identifiers and start and end times of programs to be recorded; and
wherein the program recording subsystem records programs on the at least one storage device according to the recording schedule.

37. A method, comprising:
accepting user input, the user indicates a particular program series that the user desires to record multiple episodes of, each episode of the program series has a start availability time and an end availability time;
displaying at least one input screen to the user that contains an entry field that allows the user to specify a relative amount of time in the entry field to adjust start availability times for all episodes of the program series to be recorded, the relative amount of time is displayed in the entry field in response to the user specifying the relative amount of time to adjust the start availability times for all episodes of the program series to be recorded;
scheduling a start recording time and end recording time for an episode of the program series using the episode's start availability time and end availability time, the scheduling step adjusting the scheduled start recording time for the episode program using the relative amount of time specified by the user in the entry field;
recording the episode of the program series on at least one storage device in a digital format.

38. The method of claim 37, further comprising:
 displaying a program guide to the user;
 wherein the program guide lists scheduled availability times of a plurality of programs; and
 wherein the program series is selected for recording from the program guide.

39. The method of claim 37, wherein the user is allowed to specify a desired amount of time to be added or subtracted to/from the end recording time while the episode of the program series is being recorded.

40. The method of claim 37, wherein the user is allowed to specify a length of time the episode of the program series is retained on the at least one storage device.

41. The method of claim 37, further comprising:
 playing the episode of the program series stored on the at least one storage device to the user.

42. The method of claim 37, further comprising:
 creating a recording schedule for programs scheduled to be recorded;
 wherein the recording schedule contains program identifiers and start and end times of programs to be recorded; and
 wherein the episode recording step records programs on the at least one storage device according to the recording schedule.

43. An apparatus, comprising:
 a subsystem, implemented at least partially in hardware, that accepts user input, the user indicates a particular program series that the user desires to record multiple episodes of, each episode of the program series has a start availability time and an end availability time;
 a subsystem, implemented at least partially in hardware, that displays at least one input screen to the user that contains an entry field that allows the user to specify a relative amount of time in the entry field to adjust start availability times for all episodes of the program series to be recorded, the relative amount of time is displayed in the entry field in response to the user specifying the relative amount of time to adjust the start availability times for all episodes of the program series to be recorded;
 a subsystem, implemented at least partially in hardware, that schedules a start recording time and end recording time for an episode of the program series using the episode's start availability time and end availability time, the scheduling step adjusting the scheduled start recording time for the episode using the relative amount of time specified by the user in the entry field;
 a subsystem, implemented at least partially in hardware, that records the episode of the program series on at least one storage device in a digital format.

44. The apparatus of claim 43, further comprising:
 a program guide;
 wherein the program guide lists scheduled availability times of a plurality of programs; and
 wherein the program series is selected for recording from the program guide.

45. The apparatus of claim 43, wherein the user is allowed to specify a desired amount of time to be added or subtracted to/from the end recording time while the episode of the program series is being recorded.

46. The apparatus of claim 43, wherein the user is allowed to specify a length of time the episode of the program series is retained on the at least one storage device.

47. The apparatus of claim 43, further comprising:
 a subsystem, implemented at least partially in hardware, that plays the episode of the program series stored on the at least one storage device to the user.

48. The apparatus of claim 43, further comprising:
 a recording schedule for programs scheduled to be recorded;
 wherein the recording schedule contains program identifiers and start and end times of programs to be recorded; and
 wherein the episode recording subsystem records programs on the at least one storage device according to the recording schedule.

49. A non-transitory computer readable medium storing instructions that, when executed by one or more devices, cause performance of:
 accepting user input, the user indicates a particular program series that the user desires to record multiple episodes of, each episode of the program series has a start availability time and an end availability time;
 displaying at least one input screen to the user that contains an entry field that allows the user to specify a relative amount of time in the entry field to adjust start availability times for all episodes of the program series to be recorded, the relative amount of time is displayed in the entry field in response to the user specifying the relative amount of time to adjust the start availability times for all episodes of the program series to be recorded;
 scheduling a start recording time and end recording time for an episode of the program series using the episode's start availability time and end availability time, the scheduling step adjusting the scheduled start recording time for the episode program using the relative amount of time specified by the user in the entry field;
 recording the episode of the program series on at least one storage device in a digital format.

50. The computer readable medium of claim 49, further comprising:
 displaying a program guide to the user;
 wherein the program guide lists scheduled availability times of a plurality of programs; and
 wherein the program series is selected for recording from the program guide.

51. The computer readable medium of claim 49, wherein the user is allowed to specify a desired amount of time to be added or subtracted to/from the end recording time while the episode of the program series is being recorded.

52. The computer readable medium of claim 49, wherein the user is allowed to specify a length of time the episode of the program series is retained on the at least one storage device.

53. The computer readable medium of claim 49, further comprising:
 playing the episode of the program series stored on the at least one storage device to the user.

54. The computer readable medium of claim 49, further comprising:
 creating a recording schedule for programs scheduled to be recorded;
 wherein the recording schedule contains program identifiers and start and end times of programs to be recorded; and
 wherein the episode recording step records programs on the at least one storage device according to the recording schedule.

55. A method, comprising:
accepting user input, the user indicates a particular program series that the user desires to record multiple episodes of, each episode of the program series has a start availability time and an end availability time;
displaying at least one input screen to the user that contains an entry field that allows the user to specify a relative amount of time in the entry field to adjust end availability times for all episodes of the program series to be recorded, the relative amount of time is displayed in the entry field in response to the user specifying the relative amount of time to adjust the end availability times for all episodes of the program series to be recorded;
scheduling a start recording time and end recording time for an episode of the program series using the episode's start availability time and end availability time, the scheduling step adjusting the scheduled end recording time for the episode using the relative amount of time specified by the user in the entry field;
recording the episode of the program series on at least one storage device in a digital format.

56. The method of claim 55, further comprising:
displaying a program guide to the user;
wherein the program guide lists scheduled availability times of a plurality of programs; and
wherein the program series is selected for recording from the program guide.

57. The method of claim 55, wherein the user is allowed to specify a desired amount of time to be added or subtracted to/from the end recording time while the episode of the program series is being recorded.

58. The method of claim 55, wherein the user is allowed to specify a length of time the episode of the program series is retained on the at least one storage device.

59. The method of claim 55, further comprising:
playing the episode of the program series stored on the at least one storage device to the user.

60. The method of claim 55, further comprising:
creating a recording schedule for programs scheduled to be recorded;
wherein the recording schedule contains program identifiers and start and end times of programs to be recorded; and
wherein the episode recording step records programs on the at least one storage device according to the recording schedule.

61. An apparatus, comprising:
a subsystem, implemented at least partially in hardware, that accepts user input, the user indicates a particular program series that the user desires to record multiple episodes of, each episode of the program series has a start availability time and an end availability time;
a subsystem, implemented at least partially in hardware, that displays at least one input screen to the user that contains an entry field that allows the user to specify a relative amount of time in the entry field to adjust end availability times for all episodes of the program series to be recorded, the relative amount of time is displayed in the entry field in response to the user specifying the relative amount of time to adjust the end availability times for all episodes of the program series to be recorded;
a subsystem, implemented at least partially in hardware, that schedules a start recording time and end recording time for an episode of the program series using the episode's start availability time and end availability time, the scheduling step adjusting the scheduled end recording time for the episode using the relative amount of time specified by the user in the entry field;
a subsystem, implemented at least partially in hardware, that records the episode of the program series on at least one storage device in a digital format.

62. The apparatus of claim 61, further comprising:
a program guide;
wherein the program guide lists scheduled availability times of a plurality of programs; and
wherein the program series is selected for recording from the program guide.

63. The apparatus of claim 61, wherein the user is allowed to specify a desired amount of time to be added or subtracted to/from the end recording time while the episode of the program series is being recorded.

64. The apparatus of claim 61, wherein the user is allowed to specify a length of time the episode of the program series is retained on the at least one storage device.

65. The apparatus of claim 61, further comprising:
a subsystem, implemented at least partially in hardware, that plays the episode of the program series stored on the at least one storage device to the user.

66. The apparatus of claim 61, further comprising:
a recording schedule for programs scheduled to be recorded;
wherein the recording schedule contains program identifiers and start and end times of programs to be recorded; and
wherein the episode recording subsystem records programs on the at least one storage device according to the recording schedule.

67. A non-transitory computer readable medium storing instructions that, when executed by one or more devices, cause performance of:
accepting user input, the user indicates a particular program series that the user desires to record multiple episodes of, each episode of the program series has a start availability time and an end availability time;
displaying at least one input screen to the user that contains an entry field that allows the user to specify a relative amount of time in the entry field to adjust end availability times for all episodes of the program series to be recorded, the relative amount of time is displayed in the entry field in response to the user specifying the relative amount of time to adjust the end availability times for all episodes of the program series to be recorded;
scheduling a start recording time and end recording time for an episode of the program series using the episode's start availability time and end availability time, the scheduling step adjusting the scheduled end recording time for the episode using the relative amount of time specified by the user in the entry field;
recording the episode of the program series on at least one storage device in a digital format.

68. The computer readable medium of claim 67, further comprising:
displaying a program guide to the user;
wherein the program guide lists scheduled availability times of a plurality of programs; and
wherein the program series is selected for recording from the program guide.

69. The computer readable medium of claim 67, wherein the user is allowed to specify a desired amount of time to be added or subtracted to/from the end recording time while the episode of the program series is being recorded.

70. The computer readable medium of claim 67, wherein the user is allowed to specify a length of time the episode of the program series is retained on the at least one storage device.

71. The computer readable medium of claim 67, further comprising:
   playing the episode of the program series stored on the at least one storage device to the user.

72. The computer readable medium of claim 67, further comprising:
   creating a recording schedule for programs scheduled to be recorded;
   wherein the recording schedule contains program identifiers and start and end times of programs to be recorded; and
   wherein the episode recording step records programs on the at least one storage device according to the recording schedule.

* * * * *